US012707009B2

(12) United States Patent
Mukherjee et al.

(10) Patent No.: US 12,707,009 B2
(45) Date of Patent: Aug. 11, 2026

(54) GENERATIVE AND ADAPTIVE MEDIATOR FOR REAL-TIME INTERACTIONS WITH CONVERSATIONAL AGENTS

(71) Applicant: Cisco Technology, Inc., San Jose, CA (US)

(72) Inventors: Anupam Mukherjee, Bangalore (IN); David Guoqing Zhang, Fremont, CA (US); Raul Alejandro Casas, Doylestown, PA (US); Anand Prabhu Lottiya Ganesan, Bangalore (IN)

(73) Assignee: Cisco Technology, Inc., San Jose, CA (US)

( * ) Notice: Subject to any disclaimer, the term of this patent is extended or adjusted under 35 U.S.C. 154(b) by 205 days.

(21) Appl. No.: 18/603,961

(22) Filed: Mar. 13, 2024

(65) Prior Publication Data

US 2025/0294091 A1 Sep. 18, 2025

(51) Int. Cl.
*H04M 3/493* (2006.01)
*H04M 3/436* (2006.01)

(52) U.S. Cl.
CPC ....... *H04M 3/4936* (2013.01); *H04M 3/4365* (2013.01)

(58) Field of Classification Search
CPC ....... G06N 20/00; G06N 3/08; H04M 3/4936; H04M 2201/40; H04M 3/527; H04M 3/58; H04M 3/493; H04M 3/4365; H04M 2203/355; H04M 7/0012; H04M 3/4217; H04M 3/5175; H04M 2203/357; H04M 2203/403; H04M 3/5166
See application file for complete search history.

(56) References Cited

U.S. PATENT DOCUMENTS 11,076,007 B2 * 7/2021 Laird-Mcconnell ........................ H04L 67/535
11,757,807 B2 * 9/2023 Bhardwaj .......... G06F 18/2413 709/206

(Continued)

FOREIGN PATENT DOCUMENTS

WO 2023038654 A1 3/2023

OTHER PUBLICATIONS

Nascimento N., et al., "Self-Adaptive Large Language Model (LLM)-Based Multiagent Systems", arxiv, Jul. 12, 2023, 6 Pages.

*Primary Examiner* — Akelaw Teshale
(74) *Attorney, Agent, or Firm* — Polsinelli P.C.

(57) ABSTRACT

A generative mediator engine can perform a requested interaction with a conversational agent of a target entity on behalf of a user. An internal conversational platform can identify intents for the requested interaction. An external artificial intelligence engine can perform intent discovery when an intent is not identified above a confidence threshold. A discovered intent unknown to the generative mediator engine can be received from the external artificial intelligence engine and used, with input requirements determined by the generative mediator for the requested interaction, by a dialog generator to generate a sample dialog for the requested interaction. User feedback can be received after review of action items and expected inputs identified from the sample dialog. The generative mediator engine can perform the requested interaction with the conversational agent on behalf of the user and without receiving user intervention during the requested interaction.

20 Claims, 10 Drawing Sheets

(56) References Cited

U.S. PATENT DOCUMENTS

| | | | | |
|---|---|---|---|---|
| 12,354,150 | B2 * | 7/2025 | Matsuoka | G06Q 10/06313 |
| 12,468,938 | B2 * | 11/2025 | Rodrigo Cavalin | G06N 3/006 |
| 2012/0245944 | A1 * | 9/2012 | Gruber | G06F 3/167<br>704/270.1 |
| 2014/0244712 | A1 | 8/2014 | Walters et al. | |
| 2016/0042735 | A1 * | 2/2016 | Vibbert | G10L 15/1822<br>704/257 |
| 2020/0143265 | A1 * | 5/2020 | Jonnalagadda | G06N 3/006 |
| 2020/0320978 | A1 * | 10/2020 | Chatterjee | G10L 15/1822 |
| 2022/0247700 | A1 * | 8/2022 | Bhardwaj | G06N 3/09 |
| 2023/0077130 | A1 * | 3/2023 | Matsuoka | G06Q 10/06313 |
| 2023/0092274 | A1 * | 3/2023 | Rodrigo Cavalin | G06N 3/044<br>706/11 |
| 2023/0135179 | A1 | 5/2023 | Mielke et al. | |
| 2023/0274094 | A1 | 8/2023 | Tunstall-Pedoe et al. | |
| 2024/0346342 | A1 * | 10/2024 | Lewis | G06N 3/044 |
| 2025/0118298 | A1 * | 4/2025 | Muntasir | H04M 3/4936 |

* cited by examiner

Obtain a user communication indicative of a requested interaction by an auto-adaptive mediator engine and with a conversational agent of a target entity, wherein the requested interaction is performed on behalf of a user
802

Obtain, from an artificial intelligence engine associated with the auto-adaptive mediator engine, a discovered intent corresponding to the requested interaction, wherein the discovered intent is an unknown intent for the auto-adaptive mediator engine
804

Generate a sample dialog for the requested interaction based on the discovered intent and input requirements determined by the auto-adaptive mediator engine for the requested interaction, wherein the sample dialog is generated using a dialog generator
806

Receive user feedback corresponding to action items and expected inputs identified from the sample dialog and output for user review by the auto-adaptive mediator engine
808

Generate a dialog tree based on the sample dialog, the user feedback, and user-specific information of the user communication, wherein the dialog tree uniquely corresponds to the user and the requested interaction with the conversational agent of the target entity
810

Use the auto-adaptive mediator engine and the generated dialog tree to automatically perform the requested interaction with the conversational agent of the target entity without receiving one or more user interventions during the requested interaction
812

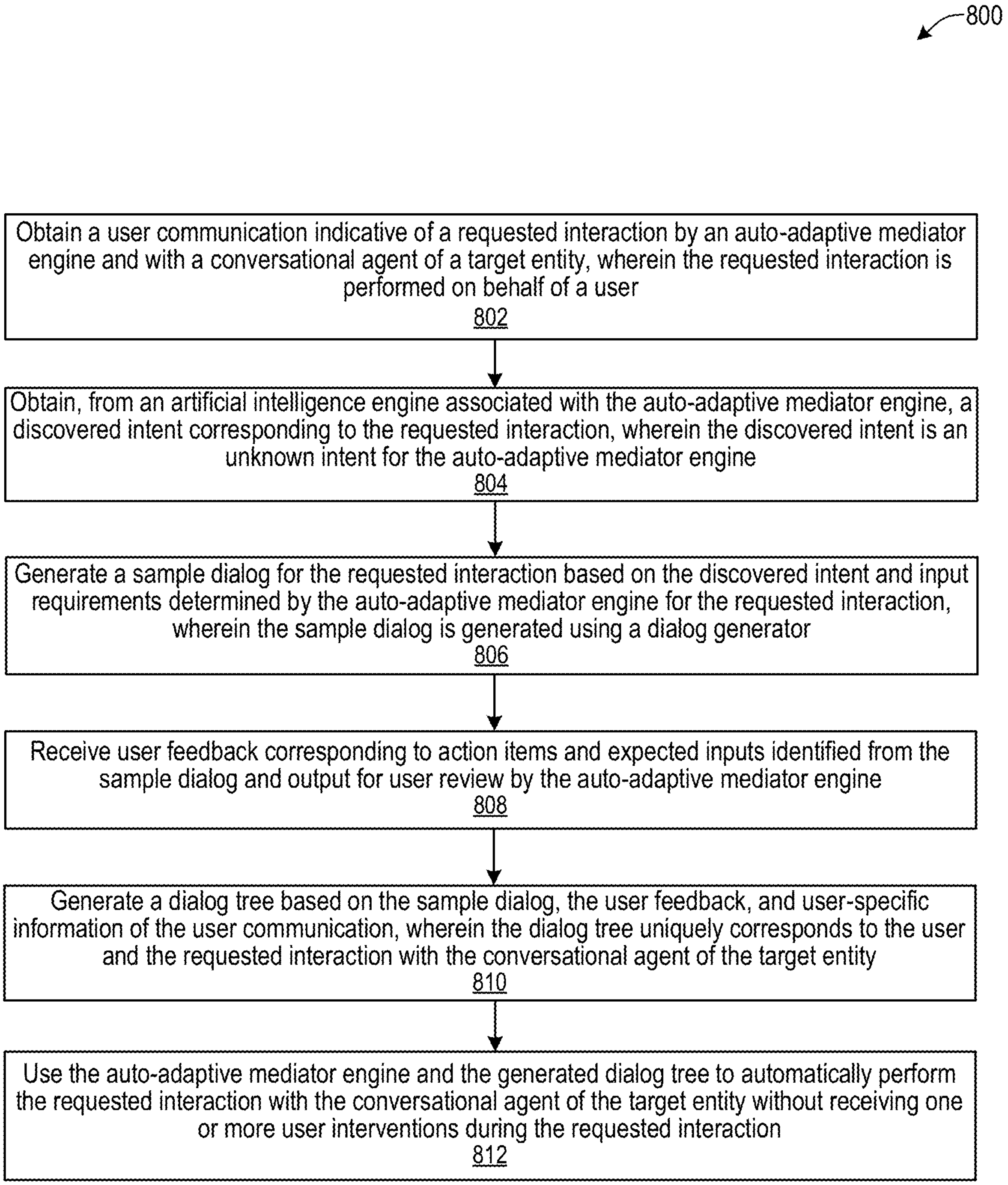

FIG. 8

GENERATIVE AND ADAPTIVE MEDIATOR FOR REAL-TIME INTERACTIONS WITH CONVERSATIONAL AGENTS

TECHNICAL FIELD

The present technology generally relates to the field of machine learning (ML) and/or artificial intelligence (AI), and more particularly, to systems and techniques for automatically mediating conversational interactions between a user and a human agent (HA) or virtual agent (VA).

BACKGROUND

Customer service interactions (e.g., contact/call center, customer support, etc.) are an important functionality used by many businesses to answer questions and provide instructions to customers, to handle issues with purchases or returns, to fulfill new orders or requests, etc. Traditionally, customer support and customer service functionalities have been performed by a staff of human agents that are employed or contracted by a business entity to handle the interactions with customers/users. Recently, virtual agents and other machine learning (ML) and/or artificial intelligence (AI)-based approaches have been developed. For example, large language models (LLMs) and other AI-based chat bots, virtual agents, virtual assistants, etc., have become more widely available and more widely used by various businesses and industries.

BRIEF DESCRIPTION OF THE DRAWINGS

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only exemplary embodiments of the disclosure and are therefore not to be considered to be limiting of its scope, the principles herein are described and explained with additional specificity and detail through the use of the accompanying drawings in which:

FIG. 8 illustrates a flowchart of an example process for automatically mediating interactions between a user and a human or virtual agent, in accordance with some aspects of the present technology.

DETAILED DESCRIPTION

Figure 1:
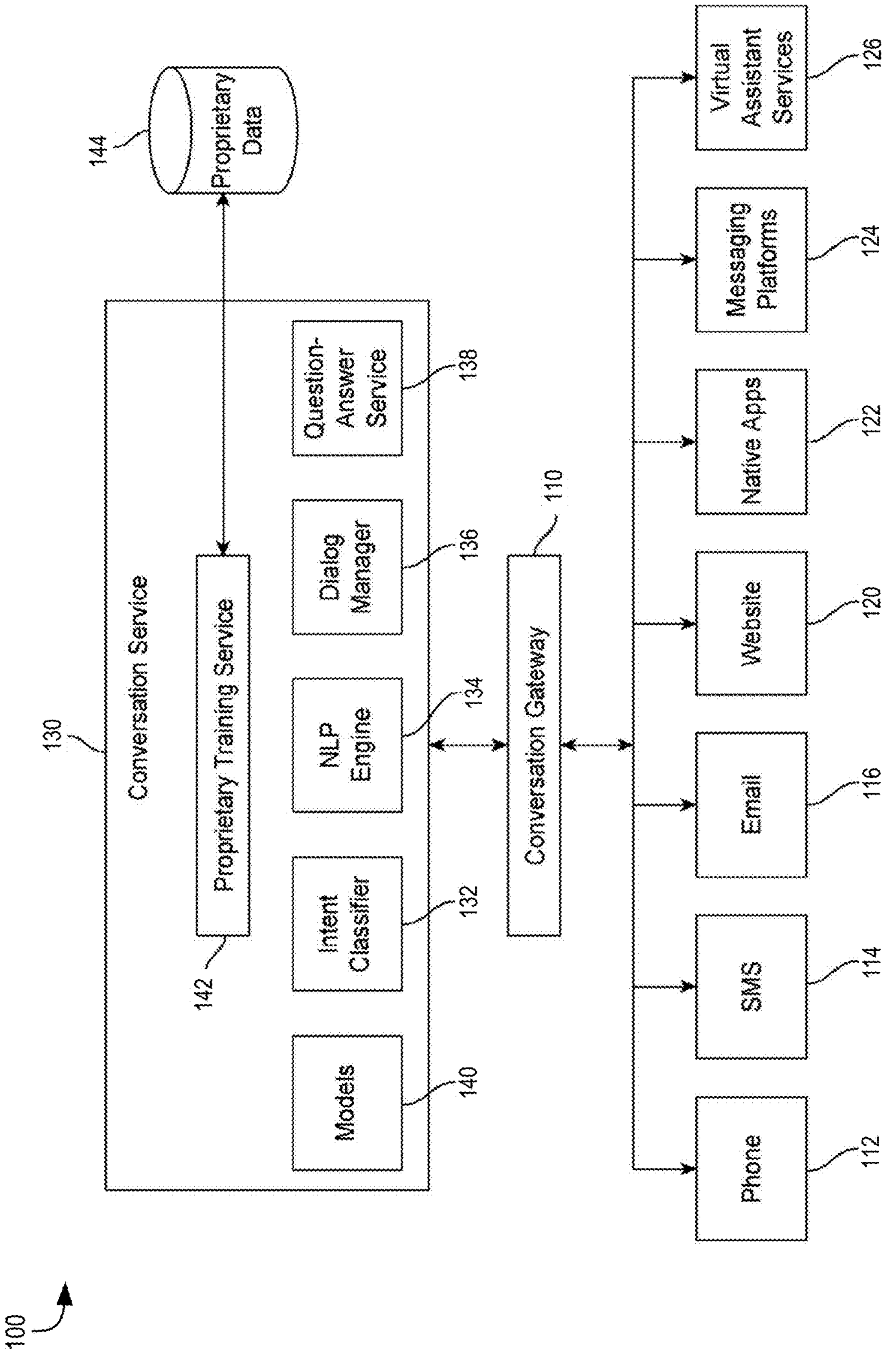
FIG. 1 is a diagram illustrating an example architecture of a conversation service, in accordance with some aspects of the present technology.

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure. Thus, the following description and drawings are illustrative and are not to be construed as limiting. Numerous specific details are described to provide a thorough understanding of the disclosure. However, in certain instances, well-known or conventional details are not described in order to avoid obscuring the description. References to one or an embodiment in the present disclosure can be references to the same embodiment or any embodiment; and such references mean at least one of the embodiments.

Reference to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others.

The terms used in this specification generally have their ordinary meanings in the art, within the context of the disclosure, and in the specific context where each term is used. Alternative language and synonyms may be used for any one or more of the terms discussed herein, and no special significance should be placed upon whether or not a term is elaborated or discussed herein. In some cases, synonyms for certain terms are provided. A recital of one or more synonyms does not exclude the use of other synonyms. The use of examples anywhere in this specification including examples of any terms discussed herein is illustrative only, and is not intended to further limit the scope and meaning of the disclosure or of any example term. Likewise, the disclosure is not limited to various embodiments given in this specification.

Without intent to limit the scope of the disclosure, examples of instruments, apparatus, methods and their related results according to the embodiments of the present disclosure are given below. Note that titles or subtitles may be used in the examples for convenience of a reader, which in no way should limit the scope of the disclosure. Unless otherwise defined, technical and scientific terms used herein have the meaning as commonly understood by one of ordinary skill in the art to which this disclosure pertains. In the case of conflict, the present document, including definitions will control.

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims or can be learned by the practice of the principles set forth herein.

Overview

Disclosed are systems, apparatuses, methods, and computer-readable media for automatically mediating and/or performing user queries to a conversational agent, for example utilizing an auto-adaptive mediator engine, in accordance with some embodiments. In one illustrative example, a method is provided, the method comprising: obtaining a user communication indicative of a requested interaction by an auto-adaptive mediator engine and with a conversational agent of a target entity, wherein the requested interaction is performed on behalf of a user; obtaining, from an artificial intelligence engine associated with the auto-adaptive mediator engine, a discovered intent corresponding to the requested interaction, wherein the discovered intent is an unknown intent for the auto-adaptive mediator engine; generating a sample dialog for the requested interaction based on the discovered intent and input requirements determined by the auto-adaptive mediator engine for the requested interaction, wherein the sample dialog is generated using a dialog generator; receiving user feedback corresponding to action items and expected inputs identified from the sample dialog and output for user review by the auto-adaptive mediator engine; generating a dialog tree based on the sample dialog, the user feedback, and user-specific information of the user communication, wherein the dialog tree uniquely corresponds to the user and the requested interaction with the conversational agent of the target entity; and using the auto-adaptive mediator engine and the generated dialog tree to automatically perform the requested interaction with the conversational agent of the target entity without receiving one or more user interventions during the requested interaction.

In some aspects, the conversational agent comprises a human agent (HA) of the target entity, or a virtual agent (VA) of the target entity.

In some aspects, obtaining the user communication indicative of the requested interaction comprises: performing, using a conversational large language model (LLM) of the auto-adaptive mediator engine, an interactive text-based communication session or an interactive voice-based communication session with the user to obtain the user communication.

In some aspects, the method further comprises: analyzing, using an internal conversational platform associated with the auto-adaptive mediator engine, the user communication to identify one or more intents corresponding to the requested interaction; determining that the identified one or more intents are not associated with a confidence score greater than a configured threshold, based on a determination that the interaction request corresponds to an unknown intent type for the auto-adaptive mediator engine, wherein the unknown intent type is not included in a plurality of intents associated with the auto-adaptive mediator engine; and transmitting the user communication to an external artificial intelligence engine configured to perform intent discovery.

In some aspects, the unknown intent type is a type of intent unseen during training of the auto-adaptive mediator engine.

In some aspects, the plurality of intents associated with the auto-adaptive mediator engine comprises one or more of: known intent types cached by an internal cache of the auto-adaptive mediator engine; or known intent types observed during training of the auto-adaptive mediator engine.

In some aspects, the method further comprises using an internal conversational platform associated with the auto-adaptive mediator engine to analyze the user communication to thereby identify a domain corresponding to one or more of the requested interaction or the target entity.

In some aspects, generating the sample dialog for the requested interaction is further based on the identified domain.

In some aspects, the dialog generator is different from an internal conversational platform associated with the auto-adaptive mediator engine and is different from the artificial intelligence engine.

In some aspects, the dialog generator comprises an internal large language model (LLM) associated with the auto-adaptive mediator engine or the artificial intelligence engine.

In some aspects, generating the dialog tree further comprises: populating the sample dialog with the user-specific information extracted from the user communication to thereby generate an output dialog; verifying the output dialog against the discovered intent, the action items, and the expected inputs associated with the requested interaction; and generating the dialog tree based on the output dialog in response to successful verification of the output dialog.

In some aspects, verifying the output dialog is based on a match score determined based on a comparison between the output dialog and the discovered intent, the action items, and the expected inputs.

In some aspects, the method further comprises: determining that a message received from the conversational agent of the target entity represents an unknown question type or a request for an unknown user input, wherein the determination is based on using the auto-adaptive mediator engine to analyze the message to determine an agent intent; and transmitting a request to the user to provide information responsive to the unknown question type or unknown user input, wherein the request to provide information is generated by the auto-adaptive mediator engine based on determined agent intent.

In some aspects, the dialog generator is selected from a plurality of pre-trained and domain-specific dialog generators, and wherein the selection is based on: an identified domain of the requested interaction, the identified domain determined based on using a domain classification machine learning model to analyze the user communication indicative of the requested interaction.

In some aspects, the selection is further based on a similarity score determined by the auto-adaptive mediator engine and corresponding to the selected dialog generator and one or more indicated user requirements of the requested interaction.

In another illustrative example, a system is provided, the system comprising: one or more processors; and one or more computer-readable storage media having computer-readable instructions stored thereon, wherein the computer-readable instructions, when executed by the one or more processors, cause the one or more processors to: obtain a user communication indicative of a requested interaction by an auto-adaptive mediator engine and with a conversational agent of a target entity, wherein the requested interaction is performed on behalf of a user; obtain, from an artificial intelligence engine associated with the auto-adaptive mediator engine, a discovered intent corresponding to the requested interaction, wherein the discovered intent is an unknown intent for the auto-adaptive mediator engine; generate a sample dialog for the requested interaction based on the discovered intent and input requirements determined by the auto-adaptive mediator engine for the requested interaction, wherein the sample dialog is generated using a dialog generator; receive user feedback corresponding to action items and expected inputs identified from the sample dialog and output for user review by the auto-adaptive mediator engine; generate a dialog tree based on the sample dialog, the user feedback, and user-specific information extracted from the user communication, wherein the dialog tree uniquely corresponds to the user and the requested interaction with the conversational agent of the target entity; and use the auto-adaptive mediator engine and the generated dialog tree to automatically perform the requested interaction with the conversational agent of the target entity without receiving one or more user interventions during the requested interaction.

In some aspects, the one or more processors are further configured to: analyze, using an internal conversational platform associated with the auto-adaptive mediator engine, the user communication to identify one or more intents corresponding to the requested interaction; determine that the identified one or more intents are not associated with a confidence score greater than a configured threshold, based on a determination that the interaction request corresponds to an unknown intent type for the auto-adaptive mediator engine, wherein the unknown intent type is not included in a plurality of intents associated with the auto-adaptive mediator engine; and transmit the user communication to an external artificial intelligence engine configured to perform intent discovery.

In some aspects, the one or more processors are further configured to: use an internal large language model (LLM) associated with the auto-adaptive mediator engine to analyze the user communication to thereby identify a domain corresponding to one or more of the requested interaction or the target entity; and generate the sample dialog for the requested interaction based on the discovered intent, the input requirements, and the identified domain.

In some aspects, to generate the dialog tree, the one or more processors are configured to: populate the sample dialog with the user-specific information extracted from the user communication to thereby generate an output dialog; verify the output dialog against the discovered intent, the action items, and the expected inputs associated with the requested interaction; and generate the dialog tree based on the output dialog in response to successful verification of the output dialog.

In another illustrative example, one or more non-transitory computer-readable media are provided comprising computer-readable instructions, which when executed by one or more processors, cause the one or more processors to: obtain a user communication indicative of a requested interaction by an auto-adaptive mediator engine and with a conversational agent of a target entity, wherein the requested interaction is performed on behalf of the user; obtain, from an artificial intelligence engine associated with the auto-adaptive mediator engine, a discovered intent corresponding to the requested interaction, wherein the discovered intent is an unknown intent for the auto-adaptive mediator engine; generate a sample dialog for the requested interaction based on the discovered intent and input requirements determined by the auto-adaptive mediator engine for the requested interaction, wherein the sample dialog is generated using a dialog generator; receive user feedback corresponding to action items and expected inputs identified from the sample dialog and output for user review by the auto-adaptive mediator engine; generate a dialog tree based on the sample dialog, the user feedback, and user-specific information extracted from the user communication, wherein the dialog tree uniquely corresponds to the user and the requested interaction with the conversational agent of the target entity; and use the auto-adaptive mediator engine and the generated dialog tree to automatically perform the requested interaction with the conversational agent of the target entity without receiving one or more user interventions during the requested interaction.

Example Embodiments

The present technology addresses the need in the art for a real-time interaction model between a user and a virtual agent (VA) and/or human agent (HA), with minimal to no human intervention by the user during the conversational interaction with the conversational agent (e.g., VA, HA, etc.). In some aspects, the systems and techniques described herein can be used to provide real-time and/or synchronous interactions with a VA or HA to provide an interaction resolution on behalf of the user. In some embodiments, the systems and techniques can be used to provide asynchronous interaction, on behalf of the user, with a VA or HA. The resolution of the interaction with the VA or HA can additionally, or alternatively, be achieved and/or communicated (e.g., notified) to the user asynchronously.

Customer service interactions are an important functionality used by many enterprises to answer questions and provide instructions to customers, to handle issues with purchases or returns, to fulfill new orders or requests, etc. Traditionally, many of these customer support and customer service functionalities have been performed by a staff of human agents that are employed or contracted by a business entity to handle the interactions with customers/users. As noted previously, recently, virtual agents and other machine learning (ML) and/or artificial intelligence (AI)-based approaches have been developed. For example, large language models (LLMs) and other AI-based chat bots, virtual agents, virtual assistants, etc., have become more widely available and more widely used by various businesses and industries to implement various customer service interactions (e.g., contact/call center, customer support, etc.).

Existing approaches to automating customer support and other customer interactions have largely been focused on the business or enterprise side of the interaction, rather than on the individualized customer side of the interaction. For instance, virtual agents or AI chatbots are available to automate the handling of common and repetitive customer support tasks that are performed by businesses, and continue to grow in popularity and availability in terms of offering businesses the ability to reduce or optimize (e.g., via automation) the involvement of human agents in handling customer interactions and user support tasks.

However, many common and repetitive tasks also exist on the customer side of these business-customer interactions, such as the user tasks of providing basic information such as name, address, date of purchase, item purchased, or the general reason for initiating a customer support interaction/session, etc. However, little work has been done in providing AI-based or other automated solutions to reduce the involvement of the human customer in the business-customer interaction or communication session. For example, currently, if a customer wants to report a lost or stolen credit card, the customer typically has to be continuously engaged in the entire reporting workflow implemented by the credit card company to handle such occurrences. The lost/stolen credit card reporting workflow for the credit card company may be executed using a VA-operated interview process or through an HA representative staffed at a contact center. During the entire phase of the interaction, the customer is required to constantly and/or repeatedly provide personally identifiable information (PII) such as name, address, phone number, social security number, etc., in multiple steps as well as clarify the queries raised by the agents. Misunderstanding and frustration are common occurrences between customer and agent, due to various factors such as language issues, accents, incomplete information or understanding, etc.

Systems, apparatuses, processes (also referred to as methods), and computer-readable media (collectively referred to as "systems and techniques") are described herein that can address these shortcomings and more, based on implementing an intelligent, LLM-based generative and auto-adaptive mediator-based real-time HA/VA interaction model that can be used to ensure minimal ambiguity and minimal user intervention during an interaction with a conversational agent (e.g., VA, HA, etc.).

For example, the systems and techniques can be used to provide automated handling and/or resolution to individuals involved in an interaction or communication session with a conversational agent. As used herein, a conversational agent may refer to a virtual agent (VA) or human agent (HA) (e.g., a virtual or human customer support agent of a business, etc.). In one illustrative example, one or more large language models (LLMs) can be used to implement a generative and auto-adaptive mediator that performs the automated handling and resolution of issues and/or communication sessions pertaining to a user of the generative mediator system. In some aspects, the generative mediator system can automate communication tasks that are otherwise performed manually by the customer (e.g., user) involved in the communication session, such that the generative mediator communicates with the virtual or human agent in lieu of the communication session or other interaction being performed by the human customer user, or with the intervention thereof.

In some aspects, the generative mediator can utilize one or more LLMs and/or other generative machine learning model or network that is trained to perform the automated mediation and customer-side interactions in the context of various different types of communication sessions for a given user. Different types of interactions, conversational queries, requests, and/or action items can be identified as corresponding to different domains, intents, and/or various combinations and sub-combinations thereof, with one or more LLMs or other models trained on the corresponding conversational information and underlying data for the grouping. In one illustrative example, the generative mediator can automatically discover, determine, or infer a particular customer intent for the current task (e.g., query) or communication session (e.g., conversational session or interaction with an HA or VA, etc.).

Notably, the generative mediator system described herein can automatically adapt to and perform customer-side communications for completely new intents (e.g., intents that were unseen during training, or for which the generative mediator system was otherwise not previously configured to handle). The generative and auto-adaptive approach described herein is an improvement over existing customer-side automations, which are largely programmatic in nature (e.g., following a logic tree or decision tree, and exiting with a fault requiring manual intervention if any unexpected situation or condition occurs that the programming is not already configured to handle).

Further aspects of the systems and techniques will be described with reference to the figures.

FIG. 1 illustrates an architecture 100 corresponding to a conversation service 130 that can be used to implement a virtual agent (VA), in accordance with some examples. In some cases, a virtual agent may be the same as or similar to a virtual assistant. In some embodiments, a virtual agent can be used to implement one or more enterprise services or functionalities, such as call center or customer support services and/or functionalities, etc. A virtual agent (VA) may be used to replace or otherwise implement same or similar tasks, duties, functions, etc., as a human agent (HA), including within the context of call center or customer support services and functionalities.

The conversation service 130 and/or one or more VAs thereof can receive queries from users and, in response, can provide appropriate responses to the queries. For those queries (or portions of queries) that are appropriately answered by general services, the query can be analyzed (e.g., such as through natural language processing (NLP)) to determine how to best handle the query.

For example, a query can be analyzed according to one or more models 140 that interpret and/or extract features from the text of the query. The one or more models 140 can be general models, and may be implemented as machine learning (ML) and/or artificial intelligence (AI) models, etc. The models 140 can assist a VA and/or the conversation service 130 in understanding the query in order to provide an appropriate answer or other response.

The conversation service 130 can analyze a query to determine the corresponding domain (e.g., a broad topic or field of the query), one or more intents (e.g., purpose(s) of the query), and/or entities represented within or otherwise associated with the query (e.g., items and/or properties that belong to the query). The conversation service 130 can include any number of domains and sub-domains that can apply to queries. For example, the conversation service 130 may parse a user query into a first top-level domain, and may further parse the user query into a first or second sub-domain of the first top-level domain, etc.

Each domain can further be subdivided into related intents that subdivide the domain into main topics or purposes defined as intents. For example, a first domain comprising a meeting domain can include a plurality of domain-specific intents and/or non-domain-specific intents (including domain agnostic intents that can apply to any domain, as well as domain-limited intents that can apply to a subset of a plurality of domains, etc.). For instance, a meeting domain can include a plurality of intents that may include, but is not limited to, intents such as greet, schedule, re-schedule, join, get meeting information, cancel, view transcript, view attendees, etc. Similarly, if a second domain comprises a calling domain, the second domain can a plurality of corresponding intents such as call, get contact, mute, volume, add callers, end call, etc. Each intent can include one or more corresponding entities (e.g., a greet intent can include a username entity; a get meeting information intent can include meeting ID, meeting URL, meeting title, and meeting host entities; etc.). Entities can be items and/or properties that belong to the query.

In the particular example of FIG. 1, the conversation service 130 can receive a query and perform initial parsing and/or analysis of the query to identify whether the query falls under certain or known domains, includes certain or known intents, and/or relates to certain or known entities. Queries can be received as user input(s) to the conversation service 130, directly or indirectly. For example, a user can interact in many ways with a system that includes or implements the conversation service 130, such as through a web app or a native app on a computational device, such as a mobile device, laptop, desktop, etc. An application gateway, such as the conversation gateway 110, can connect the conversation service 130 to any number of client devices and/or services, such as a smartphone 112, an SMS client device 114, an email client device 116, a website 120, messaging platforms 124, virtual assistant services 126, etc. Conversation gateway 110 can receive the user query from a client device, for example, and submit the query to processing by one or more query-processing services, engines, sub-components, etc., included within or implemented by the conversation service 130.

For example, the conversation service 130 can include an intent and entity classifier 132, a natural language processing (NLP) engine 134, a dialog manager 136, a question-answer service 138, etc., among various others. Although not shown in the example of FIG. 1, it is noted that in at least some aspects, the conversation service 130 can include, implement, and/or be associated with a natural language understanding (NLU) engine, a natural language inference (NLI) engine, etc.

In some embodiments, the NLP engine 134 can use natural language processing to analyze the query. For example, a query of "What's the status of Project Triangle in Galway today?" can be broken down by intent classifier 132 by breaking the sentence out into a topic about project status. The sentence can be broken up by one or more domain-specific or domain-agnostic ML or AI models 140, which may be trained by the proprietary training service 142 and/or using proprietary training data 144 (e.g., both associated with the conversation service 130 and/or implementation thereof). In some cases, the intent classifier 132 can also assign a score, where examples such as determining a high topic score of 90% for "status", identifying "Galway" as a location with a certainty of 90%, etc., may cause the dialog manager 136 to use an internal or external service to look up or otherwise obtain the queried status of Project Triangle for the specified location. In some examples, the question-answer service 138 can then be configured to provide the query result status and/or look up result to the user who submitted or is otherwise associated with the initial query to the conversation service 130.

In some embodiments, the dialog manager 136 can also manage conversational context, wherein the conversation context information is determined and utilized to link a current query to the context of one or more previous queries from the same user and/or to the same conversation service 130. Dialog manager 136, accordingly, can determine conversational context by maintaining a record of previous queries or conversations that relate to same or similar queries, domains, intents, entities, and/or originate from same, similar, related, etc., users and/or are directed to same, similar, related, etc., conversation targets (e.g., VAs, HAs, etc.). In some aspects, the dialog manager 136 can determine conversational context independent from the particular conversation form, syntax, or structure of the different queries, including whether queries are presented in the same or different manner between dialog manager 136 and the question-answer service 138, etc. In some embodiments, the ML/AI models 140 can include one or more trained general models or general virtual assistants, such that a general virtual assistant may be trained to specifically correspond to one or more specific domains (or groups of domains, etc.).

Figure 2:
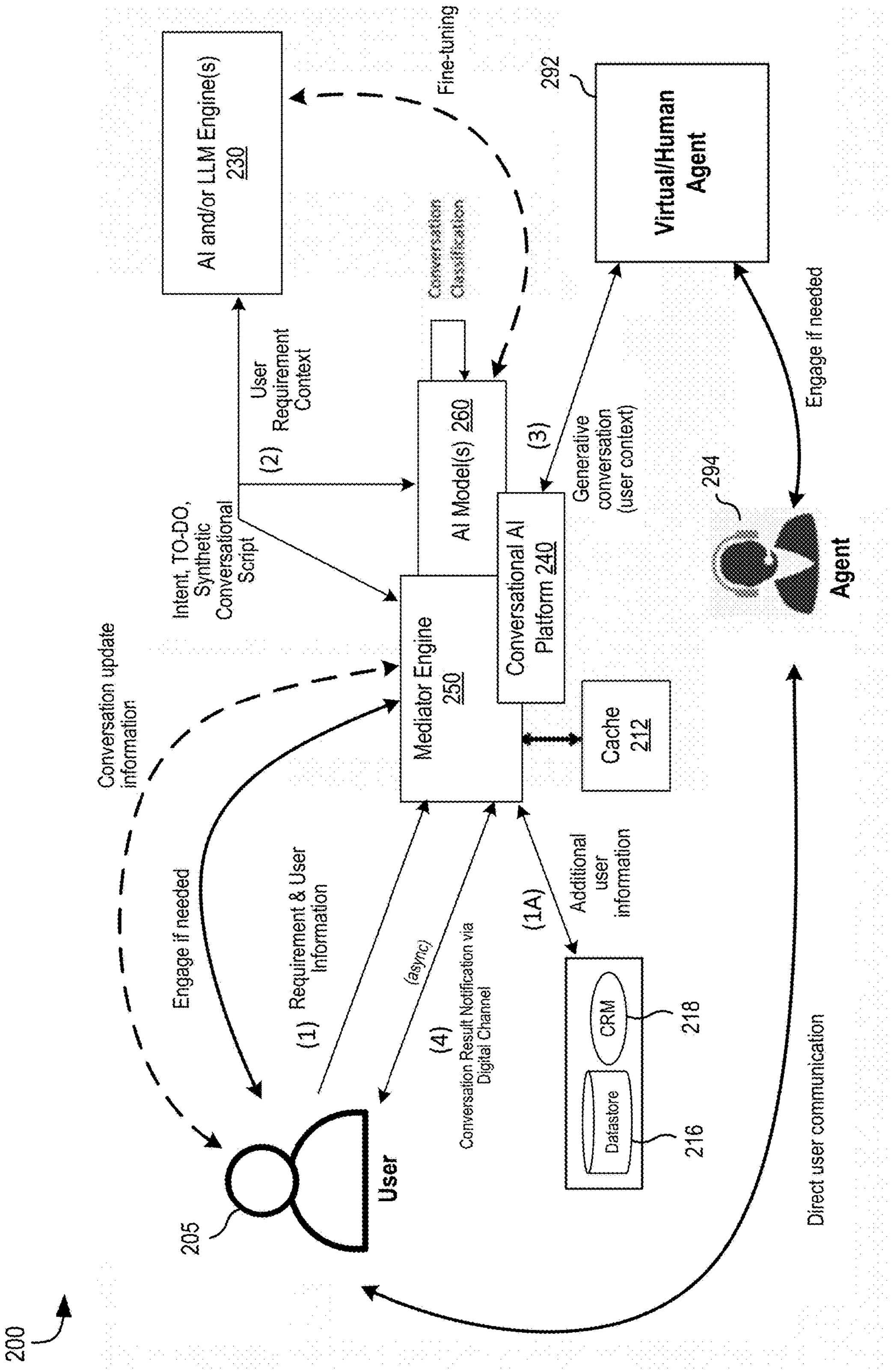
FIG. 2 is a diagram illustrating an example architecture of an auto-adaptive mediator-based system that can be used to provide real-time conversational interactions with one or more virtual agents (VAs) and/or human agents (HAs), in accordance with some aspects of the present technology.

FIG. 2 is a diagram illustrating an example architecture of a generative mediator-based system 200 that can be used to provide real-time conversational interactions with one or more virtual agents (VAs) and/or human agents (HAs), in accordance with some aspects of the present technology. Notably, the systems and techniques described herein (e.g., including the generative mediator-based system 200 of FIG. 2) can be used to provide real-time conversational interactions for individual users, wherein the disclosed mediator system and engine are associated to particular users, rather than being associated to a particular interaction, type of interaction, or business entity. For instance, while the VAs and/or HAs on the other side of the interaction with the mediator may be associated with a business or other entity for which the user is a customer, the disclosed mediator system and engine are associated with the individual user. In some examples, the same mediator system and engine can be used to perform various different interactions on behalf of a registered, individual user, where the set of interactions are performed with a variety of different business entities and HAs or VAs thereof. In some aspects, the presently disclosed systems and techniques can be used to implement a generative mediator system and engine for the user domain, and can provide automatic conversational interaction with a business domain, customer service domain, etc., in which individual users would otherwise be required to perform communications manually.

The generative mediator-based system 200 can be used to provide automated handling and/or resolution to individuals (e.g., users) involved in an interaction or communication session with a conversational agent, such as a virtual agent (VA) and/or human agent (HA) customer support representative of a business or other enterprise, etc. For instance, the generative mediator-based system 200 can be used to provide real-time interaction with a VA/HA 292 or other conversational agent 294, where the real-time interaction is provided on behalf of a user 205 of the generative mediator-based system 200. For example, the VA/HA 292 or conversational agent 294 can be associated with a business, and the user 205 can be a customer of the same business.

Notably, the generative mediator-based system 200 can include a conversational AI platform 240 that can be configured to interact with the VA/HA 292 on behalf of the user 205 to resolve a user query or user issue automatically, with minimal to no intervention required from the user 205. Upon successful resolution of the user query or user issue, the conversational AI platform 240 can communicate back to the user 205 the final outcome or other information of the resolution. In some embodiments, the conversational AI platform 240 can include and/or can be associated with a mediator engine 250 and one or more AI models 260, as will be described below.

One or more AI engines and/pr LLMs 230 can be associated with the mediator engine 250 and/or the conversational AI platform 240, and may additionally (or alternatively) be used to supplement, augment, and/or otherwise extend the functionalities implemented by the pre-trained internal AI models 260 that are included in the generative mediator-based system 200. The mediator engine 250 and conversational AI platform 240 can be used to implement a generative and auto-adaptive mediator that performs the automated handling and resolution of issues and other communication sessions between the user 205 and the VA/HA 292. If the VA/HA 292 directs the user 205 to a specific online resource for completing a required action during the conversation session, the mediator engine 250 can be used to automatically obtain any requisite information and to complete the required action without minimal to no intervention by the human user 205. In another example, if the VA/HA 292 suggests an online resource be consulted by the user 205, the mediator engine 250 can be configured to automatically obtain and analyze the identified resource to extract a corresponding answer based on the user query context and further utilizing optical character recognition (OCR), natural language understanding (NLU), and/or various other techniques.

Notably, the presently disclosed generative mediator system 200 and mediator engine 250 are configured to operate on behalf of an individual user, such as the user 205, rather than on behalf of the business or call center entity that is also involved in the communication or support session. The generative mediator system 200 and mediator engine 250 can additionally be configured to execute and mediate previously unseen tasks, conversations, and user queries/ intents, with on-the-fly learning and adaptation (e.g., as will also be described in greater detail below). The mediator engine 250 and generative mediator system 200 can automate communication tasks that would otherwise be performed manually by the user involved in the communication session (e.g., user 205), such that the presently disclosed mediator 250 is used to communicate with the virtual or human agent 292 in lieu of the human customer/user 205.

In some embodiments, the mediator engine 250 can be initially configured with user requirement information and/ or user-specific information (e.g., user profile information, user preference information, user configuration information, etc.). For instance, the requirement(s) and user information can be provided by the user 205 to the mediator engine 250, represented in FIG. 2 via the process flow "(1) Requirement & User Information".

In some aspects, the mediator engine 250 can be implemented with multi-lingual capabilities, such that the mediator engine 250 can obtain user query and/or user requirement information in various different languages and such that the generative conversation with the VA/HA 292 on behalf of the user 205 can be performed in various different language as well. In the multi-lingual mediator engine 250 implementation, the choice of language for the process flow step "(1) Requirement & User Information" may be the same as or different from the choice of language for the subsequent process flow step "(3) Generative conversation (user context)".

In some examples, the mediator engine 250 can be configured to interact with the user 205 using a preferred language configured in a user profile or user preferences corresponding to the user 205. If a preferred language is not set or otherwise indicated for the user 205, the mediator engine 250 may discover the language dynamically from the interactions with and information from the user 205. In some cases, the mediator engine 250 can be configured with a default language that is used when a user preference is not indicated. Similarly, the mediator engine 250 may be configured to interact with the VA/HA 292 using a preferred language configured for or by the VA/HA 292, using a language indicated or requested by the VA/HA 292 during the generative conversation, using a language adopted (e.g., used) by the VA/HA 292 in the opening dialog of the conversation with the mediator engine 250, etc. For instance, the mediator engine 250 can interact with the VA/HA 292 using a configured language, a dynamically discovered language for the VA/HA 292, and/or a default language of the mediator engine 250, etc.

Figure 3:
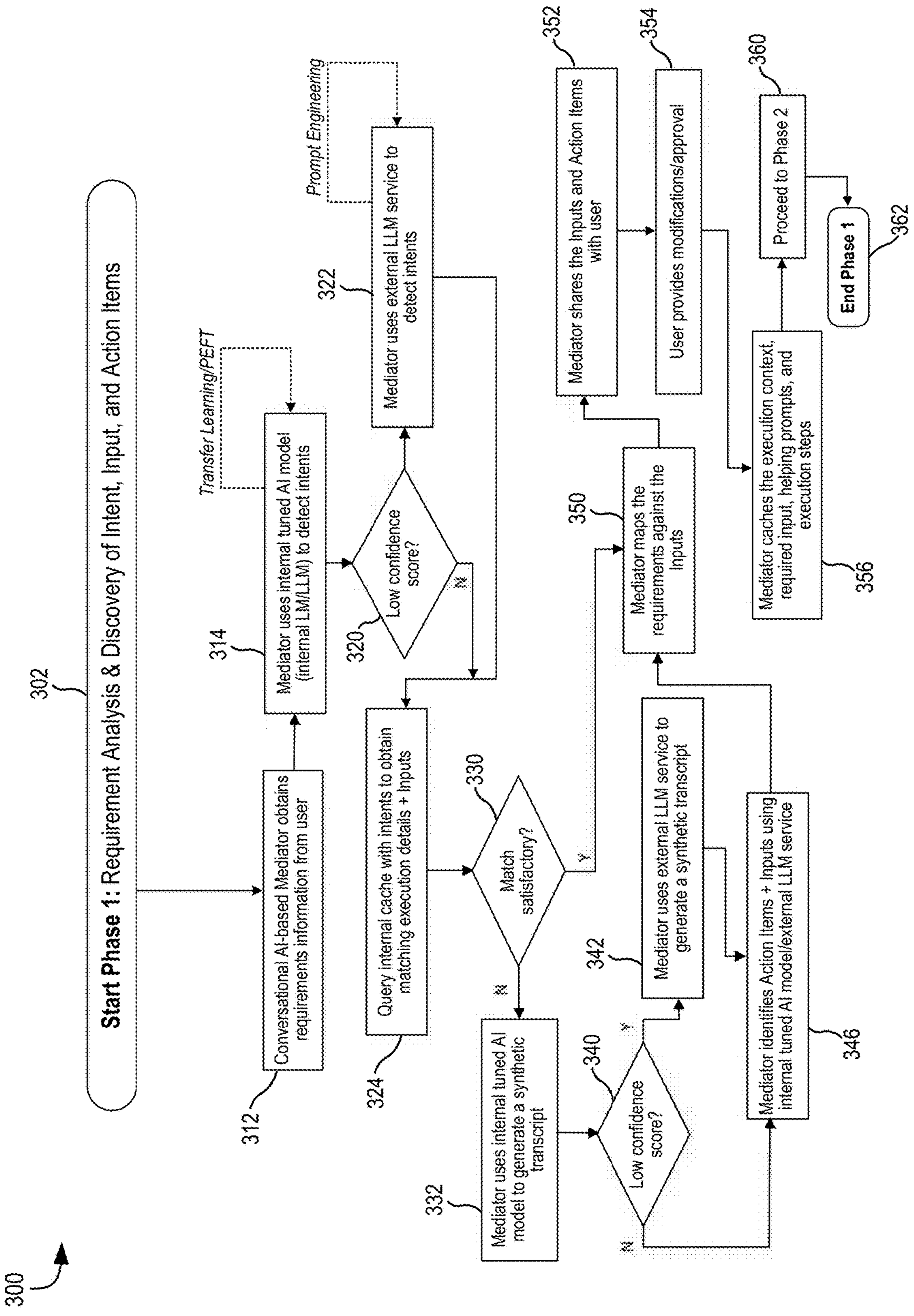
FIG. 3 is a flow diagram illustrating an example of a first conversational interaction phase that can be associated with the auto-adaptive mediator engine of FIG. 2, in accordance with some aspects of the present technology.
Figure 4:
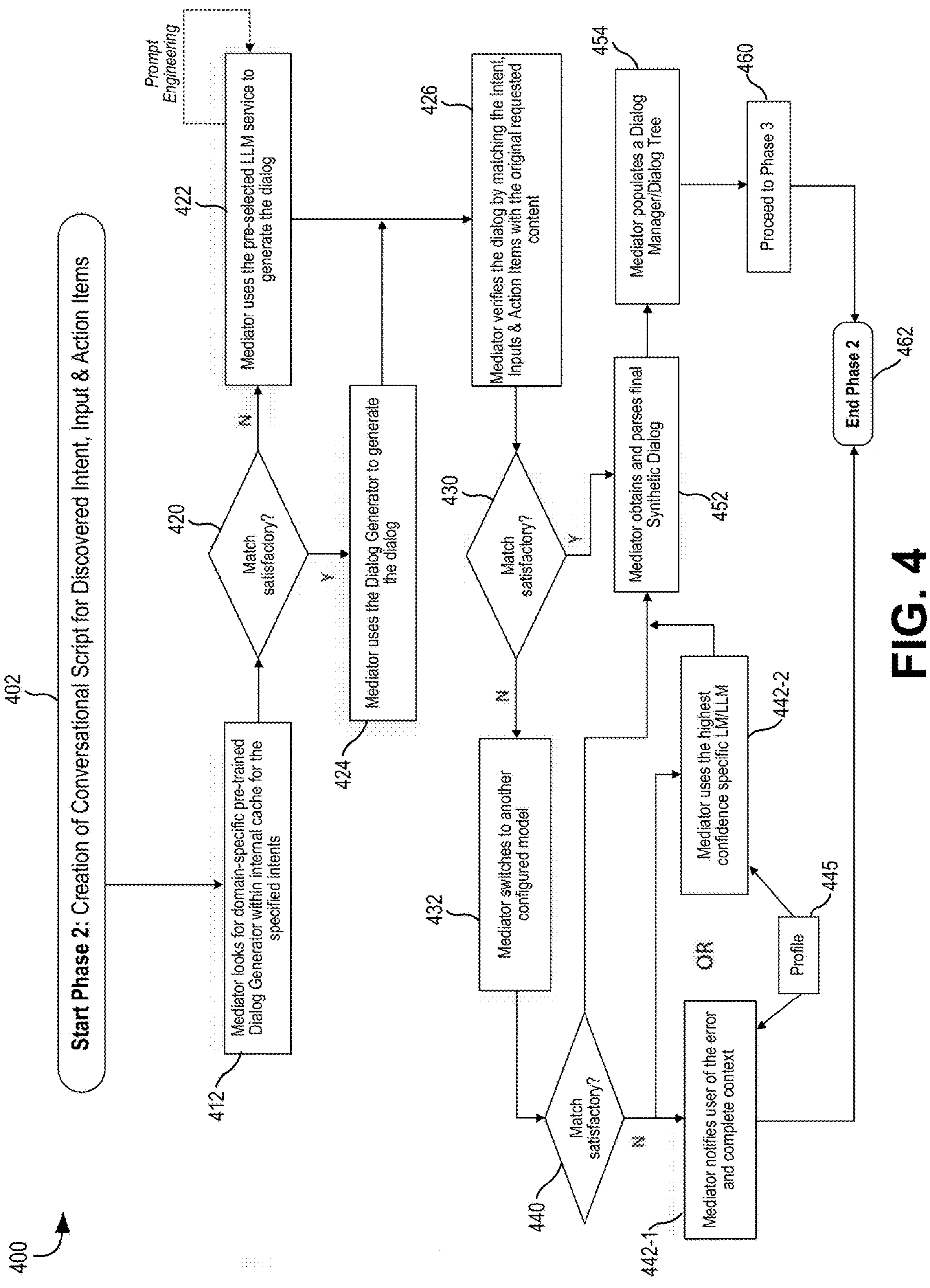
FIG. 4 is a flow diagram illustrating an example of a second conversational interaction phase that can be associated with the auto-adaptive mediator engine of FIG. 2, in accordance with some aspects of the present technology.
Figure 5:
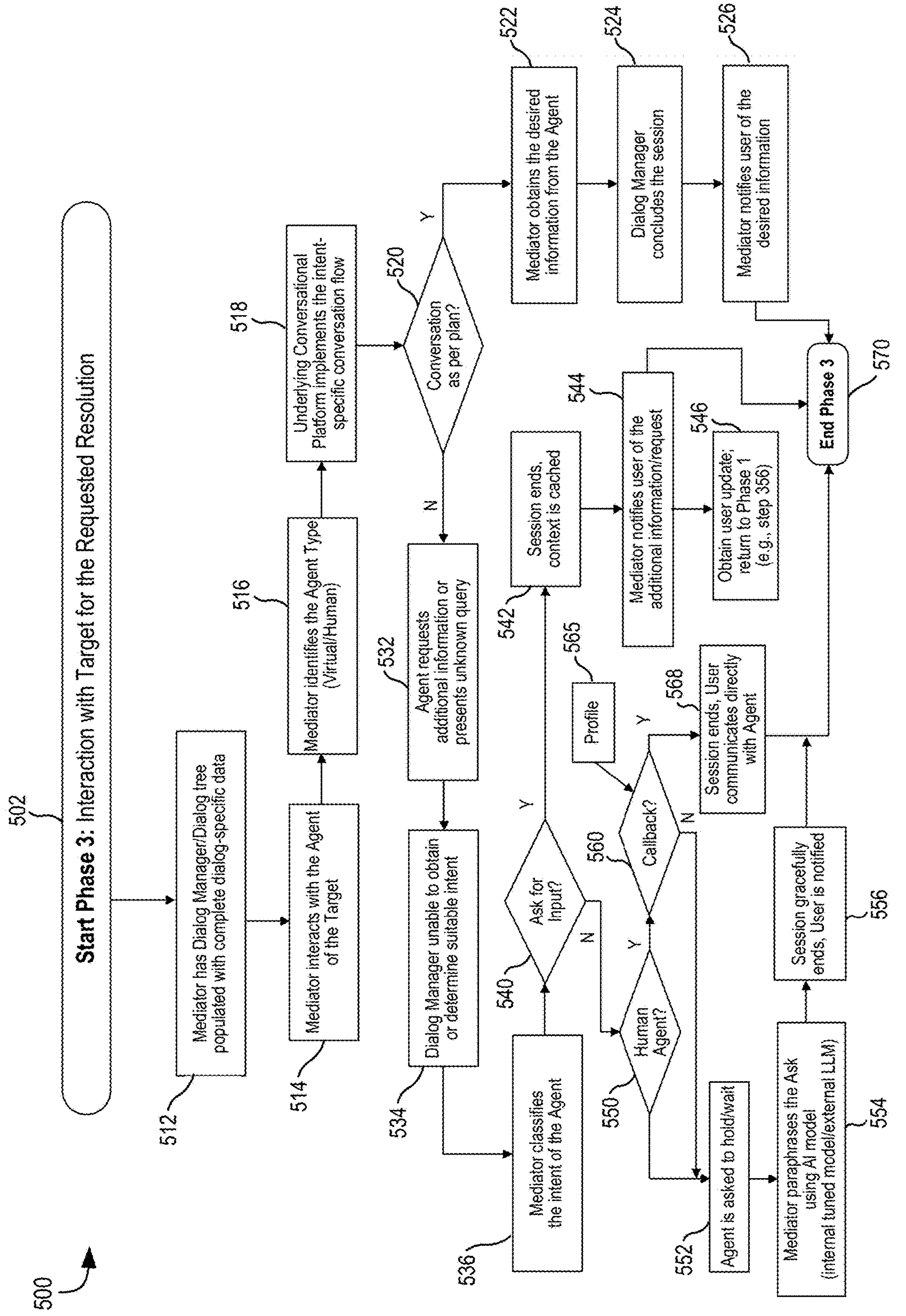
FIG. 5 is a flow diagram illustrating an example of a third conversational interaction phase that can be associated with the auto-adaptive mediator engine of FIG. 2, in accordance with some aspects of the present technology.

Reference is now made to an example process flow depicted in FIGS. 3-5 and which may be implemented by the generative mediator-based system 200 of FIG. 2. For instance, FIG. 3 is a flow diagram illustrating an example of a first phase 300 that may be performed by the generative mediator-based system 200. FIG. 4 is a flow diagram illustrating an example of a second phase 400 that may be performed by the generative mediator-based system 200, for instance upon the conclusion of or after otherwise exiting from the first phase 300 of FIG. 3. FIG. 5 is a flow diagram illustrating an example of a third phase 500 that may be performed by the generative mediator-based system 200, for example upon the conclusion of or after otherwise exiting from the second phase 400 of FIG. 4.

With respect to FIG. 3, the first phase 300 can be used to perform requirement analysis and discovery of intent, input, and action items (e.g., corresponding to a query and/or interaction session on behalf of the user 205 of FIG. 2). Phase 1 may begin at block 302, and can be triggered by the user 205 and/or can be triggered automatically by the mediator engine 250 and/or generative mediator-based system 200, etc.

At block 312, a conversational AI-based mediator (e.g., mediator engine 250 of FIG. 2) can be configured to obtain requirements information from a user (e.g., user 205 of FIG. 2). For instance, the mediator engine 250 can interact with the user 205 utilizing various different communication techniques and modalities, such as via text or spoken word. The interaction with the user 205 can be performed to understand the requirements of the user query or communication session, and to collect required information alongside personal details (e.g., PII, etc.) from the user 205. The specific information and/or personal details of the user 205 that are collected by the mediator engine 250 can be determined based at least in part on the requirements of the user query or communication session that are also determined by the mediator engine 250 at block 312 of the Phase 1 process flow 300.

For example, the mediator engine 250 can interacts with the user 205 to determine requirements for the communication session with the VA/HA 292. Based on the determined requirements, the mediator engine 250 can identify the particular types of personal details or PII that will be needed (or may be needed). In some aspects, some or all of the user information may be identified as being already available in a corresponding user profile maintained by or accessible to the mediator engine 250 for the user 205. For instance, the user profile information for user 205 can be stored in the datastore 216 and/or CRM 218 shown in FIG. 2 as being configured to provide additional user information to the mediator engine 250 (e.g., the process flow step "(1-A)

Additional user information" shown in FIG. 2). In some embodiments, if the information is not already available in a user profile, the mediator engine 250 can prompt and obtain the needed information from the user 205.

In one illustrative example, at block 312, the user 205 may invoke the mediator engine 250 and provide a prompt or query in plain English (or other user-configured language for communication), such as: "Hello, I would like your assistance to sort out a long-pending health insurance claim which has been stuck for 20 days due to some unknown reasons despite being approved. I want the money from my claim as soon as possible. My policy number is AIZ0023459 and the pending claim is CL45009. Please check where and why it is stuck, and what is required from my side. Keep me posted please."

At block 314, the mediator engine 250 can use an internal tuned AI model (e.g., internal LM, internal LLM, etc.) to detect or determine one or more intents corresponding to the user query or user requirements information. For example, based on the requirements information obtained from the user 205 at block 312 of the Phase 1 process flow 300, the mediator engine 250 can be subsequently tuned to discover a corresponding problem/request type, along with one or more intents/call drivers, for the user requirements information. For instance, the mediator engine 250 can utilize one or more AI-based algorithms or models to perform discovery of the problem or request type along with the intents or call drivers. In some embodiments, the internal tuned AI model used for intent discovery at block 314 can included in the plurality of internal AI models 260 shown in FIG. 2 as being associated with the mediator engine 250.

In some examples, the mediator engine 250 can be configured to use transfer learning and/or parameter-efficient-fine-tuning (PEFT) to improve the performance of an internal LM, internal LLM, and/or internal AI model included in the set of AI models 260. For example, transfer learning and/or PEFT can be used to improve the performance of an internal LM or internal LLM (or other AI model 260) used to perform the intent detection of block 314 of Phase 1.

At block 320, the Phase 1 process flow 300 can include a confidence determination step to evaluate a confidence score associated with the one or more user intents detected at block 314. For instance, a confidence score can be calculated for each determined intent or can be calculated for the collective set of determined intents from block 314. The calculated confidence score(s) can then be compared to one or more corresponding thresholds at block 320.

If the confidence scores for the determined intents are greater than the configured threshold, the Phase 1 process flow 300 can proceed from decision block 320 to the block 324 along the No branch (e.g., "N") exiting from decision block 320. If the confidence scores for the determined intents are not greater than the configured threshold, the Phase 1 process flow 300 can proceed from decision block 320 to block 322 along the Yes branch (e.g., "Y") exiting from decision block 320.

For example, during the interaction with the user 205, the mediator engine 250 collects and identifies all of the intents in the form of call drivers. An internal, relatively low-complexity LLM 260 can be used for initial identification or discovery of intents at block 314, as described above. If confidence is below a configured threshold at block 320, the mediator engine 250 can be triggered to connect to an external, relatively high-complexity (e.g., more powerful/capable) LLM 260 to determine the intents, at block 322 of the Phase 1 process flow 300.

For example, in response to a low confidence score for the intents determined by the internal AI model 260 of the mediator engine 250, at block 322 the mediator engine 250 can communicate with one or more external artificial intelligence engines and/or LLM services to detect the user intents. In some embodiments, the one or more external artificial intelligence engines can be configured to perform refined intent detection. The one or more external artificial intelligence engines (e.g., which include a generative transformer model, SLM, LLM, Classifier, or other machine learning model, etc.) can be included in the AI and/or LLM engines 230 of FIG. 2, shown as being communicatively coupled to the mediator engine 250 along the process flow step labeled "(2) User Requirement Context" and "Intent, To-Do, Synthetic Conversational Script". Prompt engineering can be used to refine or improve the performance of the external artificial intelligence engines 230 in performing the intent detection of block 322. In at least some embodiments, one or more (or all) of the external artificial intelligence engines and/or LLM services can be implemented by, provided by, and/or associated with the entity being interacted with. For example, one or more of the external artificial intelligence engines and/or LLM services may be provided by or associated with the same entity that is associated with the VA/HA 292 (e.g., the conversational agent with which the mediator engine 250 performs an interaction and communicates with on behalf of the user 205). In some embodiments, an external artificial intelligence engine or LLM service provided by the same entity that is associated with the VA/HA 292 can include an external artificial intelligence engine associated with intent detection, classification, identification, etc., that may be used by the mediator engine to determine or obtain one or more intents. An external artificial intelligence engine or LLM service provided by the same entity that is associated with the VA/HA 292 can additionally, or alternatively, include an external artificial intelligence engine that can be used to perform dialog generation for the mediator engine 250.

The description and example embodiments provided herein make reference to an example embodiment where one or more LLMs (e.g., internal to the mediator engine 250 and/or external to the mediator engine 250) are utilized for various purposes. It is noted that reference to LLMs is made for purposes of example and clarity of explanation, and is not intended to be construed as limiting. For example, various other AI and/or ML models, networks, techniques, algorithms, services, etc., may also be utilized for the various purposes and uses cases described herein with reference to the aspects of the present disclosure. As used herein, the term "LLM" may refer to a large language model and/or various other AI or ML models, including but not limited to, various generative AI/ML models, various AI/ML classifier models, various AI/ML recommendation or recommender models, etc., among various others. For example, the term "LLM" may refer to various other machine learning and/or artificial intelligence models and architectures that may include, but are not limited to, transformer-based AI/ML models and architectures, subspace learning machine (SLM) and SLM-based AI/ML models and architectures, LLMs and LLM-based AI/ML models and architectures, classifier and classifier-based AI/ML models and architectures, etc.

In response to a high confidence score for the intents determined by the internal AI model 260 of the mediator engine 250, at block 324 the mediator engine 250 can query its internal cache with the determined intent information in order to obtain matching execution details and necessary inputs for performing a conversational dialog based on the determined user intents. For instance, the mediator engine 250 can use the determined intents to query the internal cache 212 shown in FIG. 2.

Block 324 is also reached after the use of the external artificial intelligence and/or LLM engines 230 (e.g., at block 322) to detect the user intents, wherein the intents identified by the external artificial intelligence engines 230 are similarly used by the mediator engine 250 to query the internal cache 212 in order to obtain matching execution details and inputs for the determined intents. In some aspects, the mediator engine 250 compares the determined intents for matching entries in the internal cache 212, and determines similarity scores. Similarity scores above a pre-determined threshold trigger retrieval of the associated details for handling the intent (e.g., required input entities, execution details) at block 324 of the Phase 1 process flow 300.

In some aspects, the mediator engine 250 can use an AI model from the plurality of AI models 260 to automatically discover, determine, or infer a problem/request type and the associated intent/call drivers. Notably, the mediator engine 250 and/or AI model 260 is also capable of identifying an unknown intent and subsequently determining the most appropriate set of procedures for automatically fulfilling the intent. For example, the mediator engine 250 can identify an unknown intent and subsequently determine the most appropriate set of procedures to fulfill the unknown intent, as described below.

The mediator engine 250 can maintain an internal cache (e.g., cache 212) to store the complete list of information including execution context, required inputs, helping prompts, and/or execution steps, etc., for all known request types and/or intents for every user 205. The cached information stored in the internal cache 212 can be information determined or obtained by the mediator engine 250 in the past, e.g., in previous interactions with or communication sessions on behalf of the same user 205. In some embodiments, execution context can comprise the target details (e.g., where the target is the VA/HA 292 for the communication on behalf of the user 205) and/or the target types with which the mediator engine 250 is supposed to interact with on behalf of the user 205.

While interacting with the user 205, the mediator engine 250 can collect the user 205 requirements and with the use of AI models (e.g., an LLM, a supervised model, etc.), the mediator engine 250 can identify all the intents in form of call drivers. Here, the mediator engine 250 may first connect with its internal AI models 260 (e.g., which may include a simple transformer or low-cost LLM, etc.) to get the intents, and in case of low confidence scores the mediator engine may switch to an external artificial intelligence engine 230 (e.g., which include a generative transformer model, SLM, LLM, Classifier, or other machine learning model, etc.) to discover the proper intents. Upon discovering the appropriate intents (and with high confidence scores), the mediator engine 250 can search its internal cache 212 for the matching entries for the determined intents, for example by using an Approximate Nearest Neighbor algorithm. If the mediator engine 250 finds any match (within internal cache 212) per intent, and with a sufficiently good or high similarity score, the mediator engine 250 will retrieve the associated details from the cache 212 which includes the required input entities and execution details. In the case where there is no satisfactory match for a specific intent, the mediator engine 250 will use AI to discover the list of procedural steps for the intent and cache it. At this phase, the mediator engine 250 may use an internal LLM 260 or may query an external or third-party AI engine and/or LLM 230 to obtain the list of procedural steps corresponding to the intents.

In some aspects, for discovering the procedural steps for the specified intent, the internal model 260 of the mediator engine 250 needs to know the respective domain. In some embodiments, the systems and techniques can be implemented to finetune standard LLM models (e.g., using complete tuning or PEFT techniques, as described above with respect to the transfer learning and/or PEFT of block 314) to make the finetuned standard LLM models into domain-specific LLMs. In some embodiments, the systems and techniques may use prompt tuning techniques configured with domain-specific examples to dynamically tune the LLM (e.g., as per N-Shot Learning) while discovering the procedural steps.

In one illustrative example, at block 330 of the Phase 1 process flow 300, the mediator engine 250 can be configured to determine whether the determined intents each have a satisfactory match with information (e.g., execution details, inputs, etc.) stored for that intent within the internal cache 212. The decision block 330 satisfactory match determination can be made based on one or more configured matching thresholds. If the match is satisfactory, decision block 330 proceeds along the Yes branch ("Y") to block 350, where the mediator engine 250 maps the requirements against the inputs.

If the match is not satisfactory, decision block 330 proceeds along the No branch ("N") to block 332, where the mediator engine 250 uses an internal tuned AI model 260 to generate a synthetic transcript that matches with the determined intents.

For instance, in the context of the above example, the mediator engine 250 can be configured to prompt an LLM or other AI model or engine (e.g., included in the internal models 260, or included in the external AI and/or LLM models 230) with a suitable prompt for generating the synthetic transcript matching to the determined intents. An example prompt may be "<<For a contact center in the "health insurance" domain, generate a transcript using "specific health insurance related terminologies", for a call between an agent and a caller for the call-drivers "Query for the reasons behind delay in claim settlement" and "Requesting a prompt settlement of the approved claim" under the topic "Claim Settlement">> to get the recommended steps. For the generation of the prompt, the mediator engine 250 can use a pre-configured template for LLM prompting.

Based on the prompt generated by the mediator engine 250, the LLM or AI model (e.g., either an internal model 260 or an external model 230) can generate the corresponding synthetic transcript and provide the synthetic transcript to the mediator engine 250. An example of a synthetic transcript for the example prompt given above is depicted below:

| | |
|---|---|
| [Agent] | Thank you for calling the Health Insurance Claims Department. This is Emily. How may I assist you today? |
| [Caller] | Hi, Emily. My name is John, and I'm calling to inquire about the reasons behind the delay in settling my approved claim. It has been more than 15 business days, and I haven't received the settlement yet. |
| [Agent] | I understand your concern, John. I apologize for any inconvenience caused. To assist you further, could you please provide me with your policy number and the claim reference number? |

-continued

| | |
|---|---|
| [Caller] | Certainly, my policy number is HIP567890, and the claim reference number is C789012. |
| [Agent] | Thank you for providing the details, John. Let me check the system for you. I see that your claim for the surgical procedure performed on April 25th, 2023, was approved on May 2nd, 2023. Our standard processing time for settlements is 10 business days. However, due to unforeseen circumstances and an increase in claim volumes, there might be a slight delay. |
| [Caller] | I understand, but it has been more than 15 business days now. Could you please look into the matter and expedite the settlement process? |
| [Agent] | I apologize for the extended delay, John. Let me investigate further to ensure everything is in order. Please bear with me for a moment while I review your claim. |
| [Agent] | Thank you for your patience, John. I have reviewed your claim in detail. It appears that there was a need for additional documentation to validate the charges. Our claims team had to request the medical records from the healthcare provider to ensure proper processing. |
| [Caller] | I wasn't aware of any missing documents. Can you please let me know what specific information was needed? |
| [Agent] | Certainly, John. The required documents included the itemized bill from the hospital, medical reports, and the attending physician's notes. These documents are crucial for evaluating the charges accurately. We have now received the necessary documentation, and our claims team is actively reviewing it. I assure you that we are working diligently to expedite the settlement process. |
| [Caller] | Thank you for the update, Emily. I appreciate your efforts. Is there anything I can do to assist or speed up the settlement? |
| [Agent] | At this stage, John, we have everything we need from your end. However, I will personally follow up with our claims team, escalate your case, and prioritize it for prompt settlement. Rest assured, I'll keep you informed about the progress at regular intervals. |
| [Caller] | That's reassuring, Emily. I hope the settlement can be processed soon, as I have outstanding medical bills to take care of. |
| [Agent] | I completely understand your situation, John. As a valued policyholder, we aim to provide efficient and timely service. I assure you that we will do everything possible to expedite the settlement process and alleviate your concerns. Is there anything else I can assist you with today? |
| [Caller] | No, that covers everything for now, Emily. Thank you for your assistance and for addressing my concerns. |
| [Agent] | You're most welcome, John. It was my pleasure to assist you. If you have any further questions or need updates on your claim, please don't hesitate to reach out. Thank you for choosing our health insurance services. Have a great day! |

The synthetic transcript from the internal tuned AI model 260 (e.g., generated at block 332) is evaluated against a confidence score threshold at decision block 340. If the confidence score for the internal AI model's synthetic transcript is low, the "Y" branch is taken to block 342, where the mediator engine 250 is configured to use an external artificial intelligence engine 260 (e.g., which include a generative transformer model, SLM, LLM, Classifier, or other machine learning model, etc.) to generate the synthetic transcript. The external artificial intelligence engine service's generated synthetic transcript from block 342 is then passed to block 346. If the confidence score for the internal AI model's synthetic transcript is high, the "N" branch is taken and the Phase 1 process flow 300 proceeds directly to block 346 (e.g., skipping block 342).

At block 346 of the Phase 1 process flow 300, the mediator engine 250 is configured to identify action items and inputs for the synthetic transcript, utilizing an internal tuned AI model 260 and/or utilizing an external artificial intelligence engine service 230 (e.g., which can include a generative transformer model, SLM, LLM, Classifier, or other machine learning model, etc.). For example, the mediator engine 250 can process the sample transcript to identify the action items and a list of inputs expected from the caller (e.g., user 205) by the HA/VA 292. At this stage, the mediator engine 250 can be configured to use its own NLU models and/or an LLM to obtain or determine the action items and list of inputs expected from the caller. In some aspects, the mediator engine 250 may reuse the LLM(s) utilized in any of the previous Phase 1 steps to obtain the required information of the action items and list of inputs expected from the caller. In some cases, the list of procedural steps can be an example call transcript for handling the intent and call drivers, such as the example call transcript provided above. The mediator engine 250 can process the sample transcript to identify action items and a list of expected inputs from the caller (e.g., human user 205). An internal LLM model can be used to obtain the identified and required information from the user 205.

At block 350 of the Phase 1 process flow 300, the mediator engine 250 can be configured to map the requirements against the inputs. For example, the mediator engine 250 can check the requirement information received from the user 205 to extract one or more required entities. The required entities may be extracted using Named Entity Recognition (NER). The extracted entity information is mapped against the list of suggested inputs from the previous steps of the Phase 1 process flow 300 (e.g., from block 346).

In some embodiments, mapping the requirements against the inputs at block 350 can further include using the mediator engine 250 to generate a consolidated list of inputs, with matched data received from the human user 205 and a list of action items per identified intent (including already known and newly recommended action items for some or all intents).

At block 352, the mediator engine 250 shares the inputs and action items with the user 205 for approval or modification. For example, the mediator engine 250 can share the consolidated list of inputs generated at block 350, as described above.

Provided below is an example of a list of consolidated inputs that may be generated by the mediator engine 250 (e.g., at block 350) and shared with the user 205 (e.g., at block 352):

Consolidated Input List
- Policy Number (AIZ0023459) [status: present]
- Claim Number (CL45009) [status: present]
- Delayed Period: 20 days Claim Number (CL45009) [status: present]
- Required documents (the itemized bill from the hospital, medical reports, the attending physician's notes) [status: absent]

Action Items:
- Provide Required documents
- Ask for date of disbursement

At block 354, the mediator engine 250 receives (e.g., from the user 205), either an approval of or one or more modifications to the inputs and action items shared at block 352. For example, the user 205 may edit, add, delete, and/or otherwise modify some or all of the input information in the list of consolidated inputs and/or may make changes in the action items before approval.

For example, if the user 205 has already provided the required documents, the user 205 may edit the status of the same in the input list and action items as per the below example. For instance, in the example Consolidate Input List above, the user 205 can edit the status of the required documents from "absent" to "present", or may delete the first of the two listed action items, etc. In some embodiments, user feedback information and/or user modification information that is provided to the mediator engine (e.g., in response to a set of proposed action items or other dialog/conversational components generated by the mediator engine 250, as variously described above) can be stored for future use and/or analysis by the mediator engine 250. For example, the user feedback and modification information obtained at block 354 (and/or various other blocks of the process flows of any of FIGS. 2-5) can be stored in the local cache 212 that is included within or otherwise implemented by the mediator engine 250. In some examples, the user feedback and modification information can be stored in local cache 212 and/or can be stored in one or more of the datastores 216, CRM 218, etc. The mediator engine 250 can, in at least some embodiments, map the user feedback information to one or more learned intents, such that the user feedback can be implemented for future dialog generation scenarios involving the same or similar learned intent. In some examples, the mediator engine 250 can additionally, or alternatively, map the user feedback information to one or more existing intents known to the mediator engine 250, such that the user feedback can be implemented for future dialog generation scenarios involving the same or similar known or existing intent.

After the user 205 provides approval at block 354, the Phase 1 process flow 300 proceeds to block 356. At block 356, the mediator engine 250 caches (e.g., in internal cache 212) the execution context, required input, helping prompts, and/or execution steps information determined previously in the Phase 1 process flow 300.

After the human user 205 provides approval at block 354, the mediator engine 250 can be used to select the same LLM that handled the intent discovery to also handle the interaction/communication session with the HA/VA 292 on behalf of the user 205. For instance, after the user 205 provides approval, the mediator engine 250 can select the most recently used LLM for the future execution purposes of performing the conversational dialog with the HA/VA 292 in Phase 2 (e.g., the Phase 2 process flow 400 shown in FIG. 4 and described below). The most recently used LLM can be selected for the future execution purpose for the new or unknown intent, as this most recently used LLM already possesses the required knowledge about the intent from Phase 1.

The Phase 1 process flow 300 then proceeds to Phase 2 at block 360, and Phase 1 ends at block 362. As noted previously, before exiting Phase 1 and proceeding to Phase 2, the mediator engine 250 can be configured to cache the execution context, required input, helping prompts and execution steps (action items) for any new or unknown intent(s) identified in Phase 1. For the existing intent information, if the user 205 makes any changes or modifications at block 354, the mediator engine 250 can additionally be configured to cache (e.g., within internal cache 212) the updated details corresponding to the particular intent, which can be stored in addition to the original (unmodified) data for that particular intent.

In some aspects, the Phase 1 process flow 300 can be used by the mediator engine 250 to self-discover the most appropriate handling procedures corresponding to a totally new or unknown intent for which the mediator engine 250 was not trained upon (e.g., an intent unseen during training). New and unseen intents can be handled by the mediator engine 250 seamlessly in combination with known or seen intents, enabling seamless and on the fly operation of the mediator engine 250. The mediator engine 250 can use internal LLMs 260 and/or external artificial intelligence engines 230 (e.g., which can include a generative transformer model, SLM, LLM, Classifier, or other machine learning model, etc.) to quickly track down and incorporate domain-specific information from various sources to provide accurate, meaningful responses in a conversational manner.

As noted previously, in some examples, for the mediator engine 250 to perform processing of the sample transcript to identify the action items and list of inputs, the mediator engine 250 and/or associated models 260/230 need to know the respective domain. The systems and techniques may finetune standard LLM models (e.g., using complete tuning or PEFT mechanism) to make them domain-specific LLMs. In some cases, the systems and techniques can use prompt tuning mechanisms with domain-specific examples to dynamically tune the LLMs (e.g., as per N-Shot Learning) while processing the transcript. In some embodiments, the user 205 can interact with the mediator engine 250 in a conversational manner, and the Phase 1 process flow 300 can be performed after the user 205 shares the complete information required during the conversation. The mediator engine 250 can include or implement integrations with the CRM 218 and various other datastores 216 that already contain user-specific information corresponding to one or more user (e.g., including the user 205). In some aspects, the mediator engine 250 is configured to collect only the user 205 data that is not already known in the context of the discovered intent. If the data is of the PII type, the mediator engine 250 can ensure that the requested or obtained user information is stored only temporarily, and is deleted permanently after the completion of the necessary task. The mediator engine 250 can be configured to ensure that it does not cache customer, confidential or highly confidential information, restricted entities and PII.

FIG. 4 depicts a Phase 2 process flow 400 that can be used to create a conversational script for discovered intent, input, and action item information. In one illustrative example, the Phase 2 process flow 400 can be used to create a conversation script based on intent, input, and action item information that is discovered by the mediator engine 250 according to the Phase 1 process flow 300 of FIG. 3.

In some embodiments, the Phase 2 start at block 402 can correspond to the "Proceed to Phase 2" block 360 and/or the "End Phase 1" block 362 of the Phase 1 process flow 300 of FIG. 3.

As will be described below, the Phase 2 process flow 400 can be used to generate a dialog for the actual conversation with the HA/VA 292 or other conversational agent 294 associated with the target entity (e.g., the target entity, such as a business, with which the mediator engine 250 is used to interact with on behalf of the user 205 to execute the request, etc.).

Phase 2 begins with block 412, wherein the mediator engine 250 is configured to look for a domain-specific pre-trained dialog generator (e.g., which can be a content generation engine, such as a generative transformer model and/or large language model, etc.) corresponding to the specified intents and currently stored within and available from the internal cache 212 associated with the mediator engine 250. At this stage (e.g., block 412 and the beginning of the Phase 2 process flow 400), the mediator engine 250 already has the intent, list of inputs and specific action items approved by the user 205 in Phase 1.

For example, the mediator engine 250 can have integration with domain-specific pre-trained conversational dialog generators (e.g. Banking, Sports, Insurance, Healthcare, Tourism, Transport, etc.) powered by language models (e.g., internal dialog generator service included within the AI models 260, and/or a third-party or external artificial intelligence engine based service (e.g., which can include a generative transformer model, SLM, LLM, Classifier, or other machine learning model, etc.) included within the external artificial intelligence engines 230, etc.). For the discovered domain and intent information, the mediator engine 250 will first search its internal cache 212 for a most suitable matching dialog generator, for example with the search performed using an Approximate Nearest Neighbor algorithm.

If the mediator engine 250 identifies any domain-specific match per intent with a sufficiently good similarity score (e.g., above a threshold, at the decision block 420 to determine if the match is satisfactory), the Phase 2 process flow 400 proceeds via the "Y" branch from decision block 420 to block 424, where the mediator engine 250 uses the identified dialog generator to generate a dialog for the actual conversation with the HA/VA conversational agent 292 of the target.

If no satisfactory match is identified for a dialog generator for a specific intent, the Phase 2 process flow 400 proceeds via the "N" branch from decision block 420 to block 422, where the mediator engine 250 is configured to use a pre-selected LLM service 230 to generate a dialog for the intent. For example, in the case where there is no satisfactory match for a specific intent, the mediator engine 250 can query a third party or external artificial intelligence engine 230 (e.g., which may be preselected in the Phase 1 process flow 300 of FIG. 3, described above) to obtain the dialogs for the discovered intent and domain.

After dialog generation at either block 424 (e.g., using an internal dialog generator of the mediator engine 250) or block 422 (e.g., using external artificial intelligence engine 230 dialog generator associated with the mediator engine 250), the mediator engine 250 next verifies the generated dialog at block 426, by matching the intent, inputs, and action items with the original requested content.

For example, even if the mediator engine 250 finds a match in its internal cache 212 (e.g., at block 412), the mediator engine 250 can be configured to first generate the dialog using the selected dialog generator for the specified context (e.g., at block 424). The dialog generated at block 424 by a selected dialog generator is then checked at block 430 by configuring the mediator engine 250 to extract the intent, inputs and action items from the generated dialog for a match with the original requested content. If the match is above a pre-defined threshold at decision block 430, the mediator engine 250 determines that the match and/or selection of the particular dialog generator was satisfactory, and exits decision block 430 via the "Y" branch.

Otherwise, the mediator engine 250 exits the decision block 430 via the "N" branch and proceeds to block 432, where the mediator engine 250 is configured to switch to another external artificial intelligence engine service 230 to perform the dialog generation (e.g., regenerate a dialog with a different one of the LLMs 230, etc.), which is again verified at an additional decision block 440. In general, the mediator engine 250 can adopt a similar strategy to select the most appropriate dialog generator (e.g., which can be a content generation engine, such as a generative transformer model and/or large language model, etc.) from a group of pre-configured external artificial intelligence engine services 230 or from a group of internal LLM services 260.

If the generated dialog match is still unsatisfactory at block 440, the Phase 2 process flow 400 proceeds via the "N" branch from decision block 440 to the block 442-1, where the mediator engine 250 is configured to notify the user 205 of the error and complete context information thereof. Alternatively, the Phase 2 process flow 400 can proceed via the "N" branch from decision block 440 to the alternate block 442-2, where the mediator engine 250 is configured to use the highest confidence specific LM or LLM that was evaluated to that point in the Phase 2 process flow 400 (e.g., the specific LM or LLM that was closest to passing the satisfactory match verification of decision block 420, 430, or 440 of the Phase 2 process flow 400).

For example, in case there is no suitable match for any intent, the mediator engine 250 will either respond back to the user 205 with the detailed error message alongside complete context and matched intents to specific conversations (if any) at block 442-1, or will use the highest matching score specific dialog generator service per intent if configured at block 442-2.

In some embodiments, a user profile 445 may correspond to user preference information and/or user configuration information from the user 205. The user profile 445 can indicate a particular configuration for the Phase 2 process flow 400 and mediator engine 250 to use either block 442-1 or block 442-1 as the preference for the "N" path exiting decision block 440.

Notably, the selection of the most appropriate dialog generator or the implementation of a user configuration controlled behavior of the mediator engine 250 in the case of no satisfactory match for the dialog generation of Phase 2 allows the mediator engine 250 to self-improvise and handle unknown situations (e.g., in addition to those described with respect to the Phase 1 process flow 300 of FIG. 3, described above) intelligently with minimal to no assistance, input, intervention, interaction, etc., from the user 205.

In some aspects, for the generation of intent-specific dialog, the mediator engine can be configured to first obfuscate any PII of the user 205 and/or any restricted information, prior to sharing the information for dialog generation with the selected dialog generator used in the Phase 2 process flow 400. After the mediator engine 250 subsequently determines that the accuracy of the dialog generator is sufficiently accurate (e.g., a "Y" exit branch from one of the decision blocks 430, 440 of the Phase 2 process flow 400), the mediator engine 250 can then be configured to inject the actual information (e.g., the previously withheld or obfuscated PII, restricted information, etc.) into the generated dialog output per intent, where the injection of the actual information is performed prior to the mediator engine 250 and conversational AI platform 240 starting the real conversation with the HA/VA 292 of the target entity.

In some embodiments, the mediator engine 250 can be configured at this stage to cache the selected dialog generator details for the specified context for future use purposes. For instance, at block 452 the mediator engine 250 can obtain and parse a final synthetic dialog, as described above.

At block 454, the mediator engine 250 can use the final synthetic dialog to populate a dialog manager/dialog tree, which may be cached in the internal cache 212 associated with the mediator engine 250. For instance, once the mediator engine 250 obtains the actual dialog (e.g., the synthetic dialog once populated with the customer-specific information, as generated at block 452) for the discovered context, the mediator engine 250 can be configured to parse the actual/final generated dialog to extract the logical semantic content along with the already known context. Subsequently, the mediator engine 250 can use the same extracted information or logical semantic content from the final dialog to additionally generate a dialog tree data structure that internally encompasses all the intents and in sequential order. In some embodiments, the mediator engine 250 can populate the dialog manager and/or generate the dialog tree at block 454 based on using a corresponding ML or AI model or platform to dynamically model the context-specific dialog manager using conversational AI for deep-domain voice interfaces and chatbots.

Subsequently, the mediator engine 250 proceeds to Phase 3 (corresponding to the Phase 3 process flow 500 of FIG. 5) at block 460, and Phase 2 ends at block 462.

In some aspects, after the mediator engine 250 completes the Phase 2 process flow 400 to prepare the actual dialog to interact with the HA/VA 292 of the specified target entity using the conversational AI platform 240 that is associated with the mediator engine 250, the mediator engine 250 can switch from the Phase 2 process flow 400 of FIG. 4 to the Phase 3 process flow 500 of FIG. 5, to initiate the actual conversation. In some aspects, the dialog manager can be configured to handle both known and unknown situations via the dialog tree generated at block 454 of Phase 2 process flow 400. The dialog tree will contain nodes specific to unknown contexts and/or intents, in addition to nodes corresponding to known context(s) and respective recommended responses. For unknown context or intent, one of the options that may be implemented by the mediator engine 250 is to connect the user 205 with a human agent 294, e.g., given that the agent is human and that the user 205 configures the corresponding option in the user-specific profile 445. The detection of the Agent type can be performed by the mediator engine 250 and the dialog manager can be modeled with the appropriate step to connect the user 205 with the agent 294.

FIG. 5 depicts a Phase 3 process flow 500 that can be used to perform interaction with the conversational target for the requested resolution. In one illustrative example, the Phase 3 process flow 500 can be triggered by the Phase 2 process flow ending at block 462 and/or can be triggered by block 460, where the Phase 2 process flow 400 proceeds to the start block 502 of the Phase 3 process flow 500. In some embodiments, the Phase 3 start at block 502 can correspond to the "Proceed to Phase 3" block 460 and/or the "End Phase 2" block 462 of the Phase 12 process flow 400 of FIG. 4.

As will be described below, the Phase 3 process flow 500 can be used to configure the generative mediator to interact with the target entity (e.g., VA/HA conversational agent 292) in some manner, either via text or spoken word, and based on using the conversational AI platform 240 shown in FIG. 2 as associated with the mediator engine 250. In particular, the conversational AI platform 240 can be used with a dynamically modeled dialog manager populated with the context-specific dialog tree generated at block 454 of the Phase 2 process flow 400 of FIG. 4.

At block 512 of the Phase 3 process flow 500, the mediator engine 250 has a dialog manager and/or dialog tree data structure that was populated with complete dialog-specific and user-specific information or data during Phase 2.

At block 514, the dialog manager with the assistance of the conversational AI platform 240 can be used to interact with the HA/VA 292 of the specified target entity, based on using the modeled dialog generated in Phase 1 and Phase 2. For instance, the dialog manager and conversational AI platform 240 can use the modeled dialog of the Phase 2 dialog tree to interact with the HA/VA 292.

At block 516, the mediator engine 250 and conversational AI platform 240 can identify the agent type of the HA/VA 292. For instance, HA/VA 292 is identified as either human (HA) or virtual (VA).

At block 518, the conversational AI platform 240 can be used to implement the intent-specific conversation flow of the generated dialog, to perform the communication session with the HA/VA 292 on behalf of the user 205. The intent-specific conversation flow can be implemented based on a cycle of identifying or classifying the HA/VA conversational agent 292 intent with respect to each question or statement uttered by the HA/VA conversational agent 292 during the communication session, followed by the mediator engine using the conversational AI platform 240 to respond with the appropriate data or information, following the Phase 2-generated dialog tree.

At decision block 520, a determination is made as to whether the conversation is proceeding according to plan. The "Y" branch causes the Phase 3 process flow 500 to proceed to block 522, where the mediator obtains the desired information from the HA/VA agent 292; the dialog manager concludes the session at block 524; and the mediator notifies the user of the desired information at block 526; with the Phase 3 process flow then terminating at the "End Phase 3" block 570.

In one illustrative example, if the mediator engine 250 performs the conversation with the HA/VA 292 on behalf of the user 205 such that the conversation proceeds as per the modeled dialog from Phase 2, once the desired information (e.g., information desired by the user 205 and configured in the Phase 1 requirements discovery for the mediator engine 250) is received from the HA/VA 292, the dialog manager will logically conclude the conversation and the final response with the received information will be shared with the user 205 at block 526. At this step, the cached dialog generator originally used to generate the dialog in Phase 2 can be annotated by the mediator engine 250 with an additional status of "successful use" for more emphasis in future usage scenarios by the mediator engine 250 and conversational AI platform 240.

However, the "N" branch exiting from decision block 520 is taken when the mediator engine 520 determines that the conversation is not proceeding according to the plan of the generated dialog of Phase 2. For instance, the "N" exit branch from decision block 520 leads to block 532, corresponding to a determination that the HA/VA 292 is asking a totally new or unknown question (e.g., for instance, the HA/VA may be asking for an unknown input) and/or in response to the HA/VA 292 responding with an unknown statement.

In this case, at block 534, it is determined that the dialog manager is unable to obtain or determine a suitable intent for the new or unknown request or query from the HA/VA conversational agent 292 of the target at block 532. In some embodiments, the mediator engine 250 (e.g., the dialog manager thereof) can be configured to first attempt to identify the most relevant response by matching the intent, based on the mediator classifying the intent of the new or unknown agent query or statement at block 536.

For instance, if the dialog manager finds the calculated confidence of the attempted match for the HA/VA agent 292 intent is below a predefined threshold (e.g., set in the user profile 445 of FIG. 4), the mediator engine 250 can subsequently attempt, at block 536, to then classify the HA/VA agent 292's intent by using an AI intent classifier.

At block 540, the classification result of the AI intent classifier from block 536 is evaluated. For example, if the classification result determined by the AI intent classifier at block 536 shows as "Ask for Input", the Phase 3 process flow 500 proceeds via the "Y" branch from decision block 540 to block 542, where the mediator-based conversation session is terminated and the current context is cached. For example, at this step, the mediator engine 250 will temporarily cache the entire context and respond back to the user 205 for the unknown data via a pre-defined mechanism. The response will also contain a URL using which the user 205 can submit the requested input and resume the flow.

At block 544, the mediator engine 250 notifies the user 205 of the additional information or request of the HA/VA conversational agent 292 that causes the mediator to exit the conversation session. At block 546, the mediator engine 250 obtains the user update responsive to the new or unknown request from the HA/VA conversational agent 292 that caused the mediator to previously exit the conversation session at block 542. Subsequently, from Phase 3 block 546, the overall process returns to Phase 1 process flow 300 of FIG. 3 (e.g., and more particularly, may proceed from Phase 3 block 546 to Phase 1 block 356).

After the user 205 specifies the input, the mediator engine 250 can resume from Phase 1 block 356. The mediator engine 250 may first update the temporarily cached context (e.g., from Phase 3 block 546) and can use the temporarily cached context to start executing the request from Phase 1 block 356. The actual internal cache may be stored at cache 212 of the mediator engine 212. The actual internal cache can also be updated with the additional input for future use purposes.

Returning to decision block 540, a determination of "No" for the ask for input decision causes the Phase 3 process flow 500 to exit decision block 540 via the "N" branch. A determination of "Yes" for the ask for input decision causes the Phase 3 process flow 500 to exit decision block 540 via the "Y" branch, and terminate the session as described above at block 542.

The "N" exit branch from the ask for input decision block 540 proceeds then to decision block 550, which evaluates whether the target entity conversational agent 292 is human (HA) or virtual (VA). The user preference configuration can indicate different conversational steps to be implemented for HA and VA conversational agents.

For example, if the intent classification result of the unknown statement (evaluated at block 536) shows an intent that is new or unknown to the dialog manager, the mediator engine 250 can be configured to check the user profile 565 corresponding to the user 205. The user profile 565 of FIG. 5 can be the same as the user profile 445 of FIG. 4. In some embodiments, the user profile 565 is checked by the mediator engine 250 to determine or identify a user-configured option to handle the current condition (given a human agent as target entity conversational agent 292). In particular, if the agent 292 is human (HA), decision block 550 exits via "Y" branch to the additional decision block 560, which evaluates whether the user profile 565 indicates a user preference to be called back.

If the user preference of user profile 565 is to be called back, decision block 560 exits via the "Y" branch to block 568, where the mediator engine 250 ends the session and configures direct communication between the user 205 and the human conversational agent 292. For instance, if the user profile 565 indicates that the user 205 prefers to be called back, the mediator engine at block 568 will connect the user 205 with the human agent (HA) 292 or 294 of the target entity. During the connection provided at block 568, the mediator engine 250 will set the context for the user 205 and then the mediator session of Phase 3 process flow 500 gracefully terminates, and Phase 3 ends at block 570.

Otherwise, if the target entity conversational agent 292 is a virtual agent (VA), decision block 550 exits via the "N" branch to block 552, where the VA 292 is asked by the mediator engine 250 to hold or wait as per the configured response of the dialog tree from Phase 2.

Similarly, if the target entity conversational agent 292 is an HA, but the user profile 565 indicates callback is not preferred, the callback decision block 560 exits via the "N" branch and also proceeds to block 552, where the HA 292 is asked by the mediator engine 250 to hold or wait as per the configured response of the dialog tree from Phase 2.

From the requested hold or wait of the HA/VA 292, the Phase 3 process flow 500 proceeds from block 552 to block 554. At block 554, the mediator engine 250 is configured to paraphrase the ask using an AI model, which may be included in the internal AI models 260 and/or the external artificial intelligence engine 230 (e.g., which can include a generative transformer model, SLM, LLM, Classifier, or other machine learning model, etc.). In some embodiments, the paraphrasing step of block 554 of Phase 3 process flow 500 can be implemented such that the mediator engine 250 internally follows a similar type of algorithm as described previously above with respect to the Phase 2 process flow 400 of FIG. 4, wherein the mediator engine 250 uses an internal AI paraphrasing model 260 or a third party external artificial intelligence engine service 230 (e.g., depending on maximum similarity score with the actual statement).

After the AI paraphrase is generated at block 554, the mediator engine 250 can be configured to update the dialog manager with a new concluding response at block 556.

For instance, at block 556, the mediator engine 250 can update the dialog manager with a new concluding response such as "If you are saying . . . , I will get back to you once I collect the details. Thanks for your help. Bye for now". Here, the dialog manager can subsequently be configured to logically conclude the conversation with the HA/VA conversational agent 292 on behalf of the user 205. The final status with the actual or paraphrased response from the HA/VA conversational agent 292 can be shared with the user 205 at block 556, and the Phase 3 process flow 500 can end at block 570. The internal cache 212 of the mediator engine 250 will not be updated at this step.

In some embodiments, during the concluding phase(s) of the Phase 3 process flow 500, the mediator engine 250 can also identify a concluding status of the conversation and/or the remaining or outstanding to-do items (if any). In some aspects, the mediator engine 250 can communicate and asynchronously notify the user 205 via a preferred digital mode of communication, as depicted in the example of FIG. 2 (e.g., the FIG. 2 step labeled "(4) Conversation Result Notification via Digital Channel (async)"). Notably, the conversation result notification, and more generally the resolution of interactions between a user 205 and an agent (e.g., HA, VA, etc.) 292 can be implemented and performed asynchronously, such that real-time involvement is not required by the user 205. In some cases, asynchronous communications and resolution of interactions with an HA/VA 292 can include asynchronous communications between the HA/VA 292 and the mediator engine 250 that is used to perform the interaction on behalf of the user In some examples, as an additional part of the concluding flow of the Phase 3 process 500, the mediator engine 250 can execute additional responsibilities if required, for example with the mediator engine 250 optionally configured to perform topic modeling, intent recognition, satisfaction derivation on the problem resolution, etc., among various other additional responsibilities.

In some aspects, to implement the Phase 1 process flow 300 of FIG. 3, the Phase 2 process flow 400 of FIG. 4, and the Phase 3 process flow 500 of FIG. 5, the mediator engine 250 is configured to use its own, internal LLMs (e.g., internal LLMs included in or implemented by the internal AI models 260 associated with the mediator engine 250). The internal LLMs of the mediator engine 250 may be tuned (e.g., fine-tuned) to satisfy different asks and/or intents in various different domains. While the mediator engine 250 in at least some embodiments can be configured to use third party or external artificial intelligence engine services 230, in some embodiments the mediator engine 250 may preferentially use internal LLMs of the AI models 260 when available, for example to provide better control, security, and/or sanctity of the outcome.

In some aspects, fine-tuning for an internal LLM 260 and/or external artificial intelligence engine 230 can be implemented using various or multiple approaches or techniques, which can include, but are not limited to, conventional finetuning and parameter efficient finetuning (PEFT), as noted previously. In the example of conventional finetuning, the systems and techniques can finetune the output layers or all the layers depending on factors such as the type of model, dataset and cost of training process, etc. In some embodiments, a feature-based approach can be utilized, such as in scenarios where there is a particular interest or focus in generating the output embeddings for the training set, which can be used as input features to train a classification model. The feature-based approach can be used with embedding-focused machine learning models such as BERT, but may additionally be used to extract embeddings from generative machine learning models or LLMs, including GPT and/or GPT-based models, without departing from the scope of the present disclosure.

In the example of implementing PEFT techniques for or by the mediator engine 250, techniques such as prompt engineering and/or low rank adaptation (LORA) can be utilized, among various others. PEFT techniques can enable the reuse of pre-trained models while minimizing the computational and resource footprints. PEFT can also result in faster models while also reducing overfitting as well. In some embodiments, to avoid the issue normally faced when finetuning an LLM (e.g., reduced accuracy on an out-of-distribution (OOD) dataset), the systems and techniques can utilize a Wise-FT or Wise-FT-based technique.

Figure 6A:
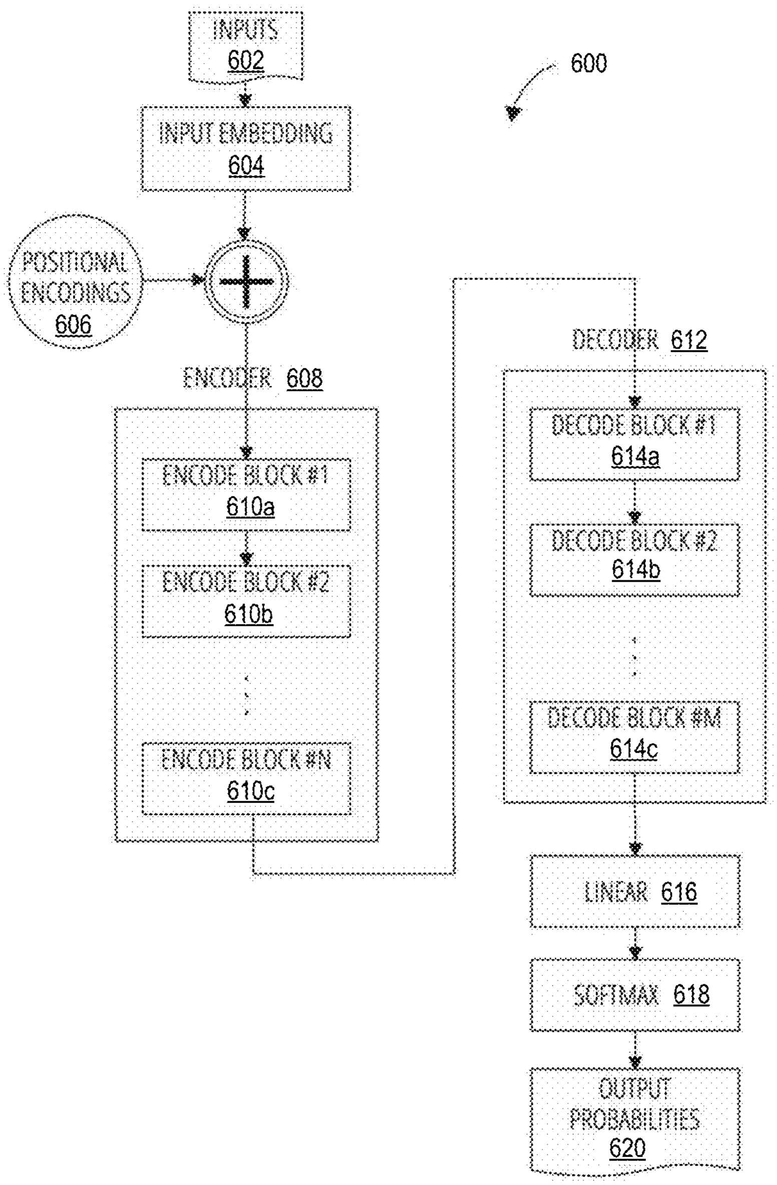
FIG. 6A illustrates a block diagram depicting an example of a transformer neural network architecture, in accordance with some aspects of the present technology.

FIG. 6A illustrates a block diagram depicting an example of a transformer neural network architecture 600, in accordance with certain embodiments. As discussed above, one or more of the LLM engines 230, the AI models 260, the mediator engine 250, and/or the conversational AI platform 240 of FIG. 2 can use a transformer machine learning architecture 600, such as a Generative Pre-trained Transformer (GPT) model, a Bidirectional Encoder Representations from Transformers (BERT) model, etc. According to certain non-limiting examples, the transformer architecture 600 is illustrated in FIG. 6A through FIG. 6C as including inputs 602, an input embedding block 604, positional encodings 606, an encoder 608 (e.g., encode blocks 610*a*, 610*b*, and 610*c*), a decoder 612 (e.g., decode blocks 614*a*, 614*b*, and 614*c*), a linear block 616, a softmax block 618, and output probabilities 620.

The input embedding block 604 is used to provide representations for words. For example, embedding can be used in text analysis. According to certain non-limiting examples, the representation is a real-valued vector that encodes the meaning of the word in such a way that words that are closer in the vector space are expected to be similar in meaning. Word embeddings can be obtained using language modeling and feature learning techniques, where words or phrases from the vocabulary are mapped to vectors of real numbers. According to certain non-limiting examples, the input embedding block 604 can be learned embeddings to convert the input tokens and output tokens to vectors of dimension that have the same dimension as the positional encodings, for example.

The positional encodings 606 provide information about the relative or absolute position of the tokens in the sequence. According to certain non-limiting examples, the positional encodings 606 can be provided by adding positional encodings to the input embeddings at the inputs to the encoder 608 and decoder 612. The positional encodings have the same dimension as the embeddings, thereby enabling a summing of the embeddings with the positional encodings. There are several ways to realize the positional encodings, including learned and fixed. For example, sine and cosine functions having different frequencies can be used. That is, each dimension of the positional encoding corresponds to a sinusoid. Other techniques of conveying positional information can also be used, as would be understood by a person of ordinary skill in the art. For example, learned positional embeddings can instead be used to obtain similar results. An advantage of using sinusoidal positional encodings rather than learned positional encodings is that so doing allows the model to extrapolate to sequence lengths longer than the ones encountered during training.

Figure 6B:
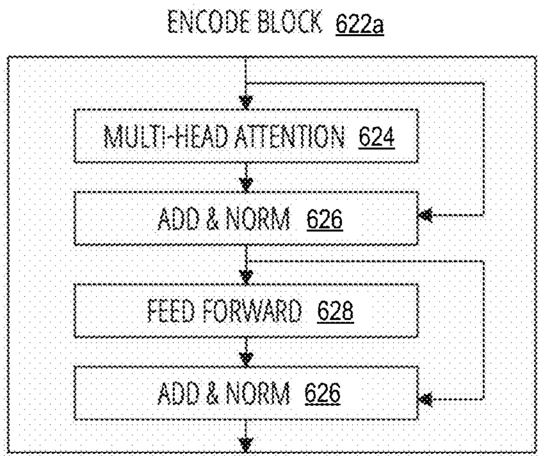
FIG. 6B illustrates a block diagram of an example of an encoder of the transformer neural network architecture of FIG. 6A, in accordance with some aspects of the present technology.
Figure 6C:
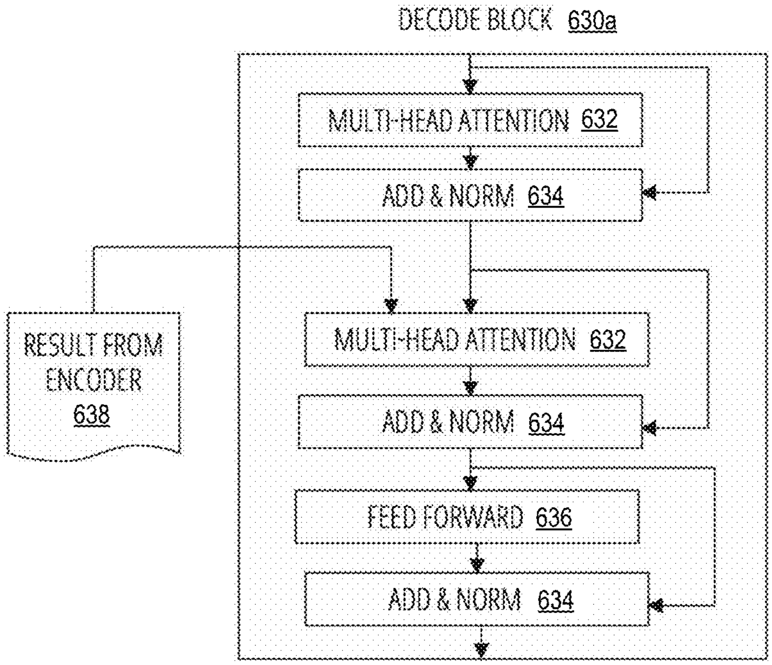
FIG. 6C illustrates a block diagram of an example of a decoder of the transformer neural network architecture of FIG. 6A, in accordance with some aspects of the present technology.

FIG. 6B illustrates a block diagram for an example of an encoder of the transformer neural network architecture, in accordance with certain embodiments.

The encoder 608 uses stacked self-attention and point-wise, fully connected layers. The encoder 608 can be a stack of N identical layers (e.g., N=6), and each layer is an encode block 610, as illustrated by encode block 610*a* shown in FIG. 6B. Each encode block 610 has two sub-layers: (i) a first sub-layer has a multi-head attention block 624 and (ii) a second sub-layer has a feed forward block 628, which can be a position-wise fully connected feed-forward network. The feed forward block 628 can use a rectified linear unit (ReLU).

The encoder 608 uses a residual connection around each of the two sub-layers, followed by an add & norm block 626, which performs normalization (e.g., the output of each sub-layer is LayerNorm (x+Sublayer (x)), i.e., the product of a layer normalization "LayerNorm" time the sum of the input "x" and output "Sublayer (x)" of the sublayer LayerNorm (x+Sublayer (x)), where Sublayer (x) is the function implemented by the sub-layer). To facilitate these residual connections, all sub-layers in the model, as well as the embedding layers, produce output data having a same dimension.

FIG. 6C illustrates a block diagram for an example of a decoder of the transformer neural network architecture, in accordance with certain embodiments.

Similar to the encoder 608, the decoder 612 uses stacked self-attention and point-wise, fully connected layers. The decoder 612 can also be a stack of M identical layers (e.g., M=6), and each layer is a decode block 614, as illustrated by decode block 614*a* shown in FIG. 6C. In addition to the two sub-layers (i.e., the sublayer with the multi-head attention block 624 and the sub-layer with the feed-forward block 626) found in the encode block 610*a*, the decode block 614*a* can include a third sub-layer, which performs multi-head attention over the output of the encoder stack. Similar to the encoder 608, the decoder 612 uses residual connections around each of the sub-layers, followed by layer normalization. Additionally, the sub-layer with the multi-head attention block 624 can be modified in the decoder stack to prevent positions from attending to subsequent positions. This masking, combined with fact that the output embeddings are offset by one position, ensures that the predictions for position i can depend only on the known output data at positions less than i.

The linear block 616 can be a learned linear transformation. For example, when the transformer architecture 600 is being used to translate from a first language into a second language, the linear block 616 projects the output from the last decode block 614*c* into word scores for the second language (e.g., a score value for each unique word in the target vocabulary) at each position in the sentence. For instance, if the output sentence has seven words and the provided vocabulary for the second language has 10,000 unique words, then 10,000 score values are generated for each of those seven words. The score values indicate the likelihood of occurrence for each word in the vocabulary in that position of the sentence.

The softmax block 618 then turns the scores from the linear block 616 into output probabilities 620 (which add up to 1.0). In each position, the index provides for the word with the highest probability, and then map that index to the corresponding word in the vocabulary. Those words then form the output sequence of the transformer architecture 600. The softmax operation is applied to the output from the linear block 616 to convert the raw numbers into the output probabilities 620 (e.g., token probabilities), which are used in the process of generating an output (e.g., output prediction, etc.) based on one or more inputs.

Figure 7A:
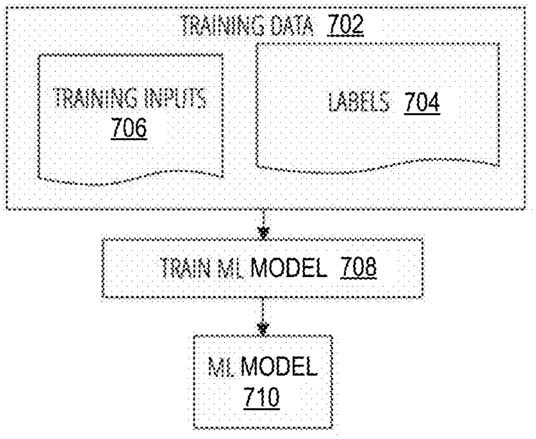
FIG. 7A illustrates a flow diagram depicting an example of a process of training a machine learning model, in accordance with some aspects of the present technology.

FIG. 7A illustrates an example of training an ML model 710 in accordance with certain embodiments. In some aspects, the ML model 710 can be the same as or similar to one or more of the LLM engines 230, the AI models 260, the mediator engine 250, and/or the conversational AI platform 240 of FIG. 2, etc. As illustrated in FIG. 7A, in step 708, training data 702 (e.g., which includes the training inputs 706 and corresponding labels 704 labels) is applied to train the ML model 710. For example, the ML model 710 can be an artificial neural network (ANN) that is trained via supervised learning using a backpropagation technique to train the weighting parameters between nodes within respective layers of the ANN. In supervised learning, the training data 702 is applied as an input to the ML model 710, and an error/loss function is generated by comparing the output from the ML model 710 with the labels 704. The coefficients of the ML model 710 are iteratively updated to reduce an error/loss function. The value of the error/loss function decreases as outputs from the ML model 710 increasingly approximate the labels 704. In other words, the ANN infers the mapping implied by the training data, and the error/loss function produces an error value related to the mismatch between the labels 704 and the outputs from the ML model 710 that are produced as a result of applying the training inputs 706 to the ML model 710.

For example, in certain implementations, the cost function can use the mean-squared error to minimize the average squared error. In the case of a multilayer perceptron (MLP) neural network, the backpropagation algorithm can be used for training the network by minimizing the mean-squared-error-based cost function using a gradient descent method.

Training a neural network model essentially means selecting one model from the set of allowed models (or, in a Bayesian framework, determining a distribution over the set of allowed models) that minimizes the cost criterion (i.e., the error value calculated using the error/loss function). Generally, the ANN can be trained using any of the numerous algorithms for training neural network models (e.g., by applying optimization theory and statistical estimation).

For example, the optimization method used in training artificial neural networks can use some form of gradient descent, using backpropagation to compute the actual gradients. This is done by taking the derivative of the cost function with respect to the network parameters and then changing those parameters in a gradient-related direction. The backpropagation training algorithm can be: a steepest descent method (e.g., with variable learning rate, with variable learning rate and momentum, and resilient backpropagation), a quasi-Newton method (e.g., Broyden-Fletcher-Goldfarb-Shannon, one step secant, and Levenberg-Marquardt), or a conjugate gradient method (e.g., Fletcher-Reeves update, Polak-Ribiére update, Powell-Beale restart, and scaled conjugate gradient). Additionally, evolutionary methods, such as gene expression programming, simulated annealing, expectation-maximization, non-parametric methods, and particle swarm optimization, can also be used for training the ML model 710.

The training ML method 708 of the ML model 710 can also include various techniques to prevent overfitting to the training data 702 and for validating the trained ML model 710. For example, bootstrapping and random sampling of the training data 702 can be used during training.

In addition to supervised learning used to initially train the ML model 710, the ML model 710 can be continuously trained while being used by using reinforcement learning based on the network measurements and the corresponding configurations used on the network. The ML model 710 can be cloud-based and trained using network measurements and the corresponding configurations from other networks that provide feedback to the cloud.

Further, other machine learning (ML) algorithms can be used for the ML model 710, and the ML model 710 is not limited to being an ANN. For example, there are many machine-learning models, and the ML model 710 can be based on machine-learning systems that include generative adversarial networks (GANs) that are trained, for example, using pairs of network measurements and their corresponding optimized configurations, etc.

As understood by those of skill in the art, machine-learning-based classification techniques can vary depending on the desired implementation. For example, machine-learning classification schemes can utilize one or more of the following, alone or in combination: hidden Markov models, recurrent neural networks (RNNs), convolutional neural networks (CNNs); Deep Learning networks, Bayesian symbolic methods, general adversarial networks (GANs), support vector machines, image registration methods, and/or applicable rule-based systems. Where regression algorithms are used, they can include but are not limited to: Stochastic Gradient Descent Regressors, and/or Passive Aggressive Regressors, etc.

Machine learning classification models can also be based on clustering algorithms (e.g., a Mini-batch K-means clustering algorithm), a recommendation algorithm (e.g., a Miniwise Hashing algorithm, or Euclidean Locality-Sensitive Hashing (LSH) algorithm), and/or an anomaly detection algorithm, such as a Local outlier factor. Additionally, machine-learning models can employ a dimensionality reduction approach, such as, one or more of: a Mini-batch Dictionary Learning algorithm, an Incremental Principal Component Analysis (PCA) algorithm, a Latent Dirichlet Allocation algorithm, and/or a Mini-batch K-means algorithm, etc.

Figure 7B:
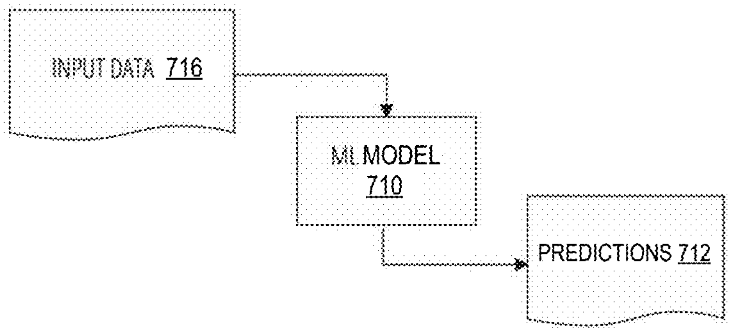
FIG. 7B illustrates a flow diagram depicting an example of a process of using the trained machine learning model of FIG. 7A, in accordance with some aspects of the present technology.

FIG. 7B illustrates an example of using the trained ML model 710. The input data 716 are applied to the trained ML model 710 to generate as output(s) the corresponding predictions 712 that are determined by the trained ML model 710 based on the input data 716.

FIG. 8 illustrates a flowchart of an example process 800 for automatically mediating interactions between a user and a human or virtual agent. It is also understood that the example process 800 of FIG. 8 and/or various other processes described herein can also be implemented using one or more processors and memories having computer-readable instructions stored thereon, which when executed by the one or more processors cause the one or more processors to perform operations including some or all of process 800. Although process 800 depicts a particular sequence of operations, the sequence may be altered without departing from the scope of the present disclosure. For example, some of the operations depicted may be performed in parallel or in a different sequence that does not materially affect the function of process 800. In other examples, different components of an example device or system that implements process 800 may perform functions at substantially the same time or in a specific sequence.

At block 802, the process 800 can include obtaining a user communication indicative of a requested interaction by an auto-adaptive mediator engine and with a conversational agent of a target entity, wherein the requested interaction is performed on behalf of a user.

At block 804, the process 800 can include obtaining, from an artificial intelligence engine associated with the auto-adaptive mediator engine, a discovered intent corresponding to the requested interaction, wherein the discovered intent is an unknown intent for the auto-adaptive mediator engine.

At block 806, the process 800 can include generating a sample dialog for the requested interaction based on the discovered intent and input requirements determined by the auto-adaptive mediator engine for the requested interaction, wherein the sample dialog is generated using a dialog generator (e.g., which can be a content generation engine, such as a generative transformer model and/or large language model, etc.).

At block 808, the process 800 can include receiving user feedback corresponding to action items and expected inputs identified from the sample dialog and output for user review by the auto-adaptive mediator engine.

At block 810, the process 800 can include generating a dialog tree based on the sample dialog, the user feedback, and user-specific information extracted from the user communication, wherein the dialog tree uniquely corresponds to the user and the requested interaction with the conversational agent of the target entity.

At block 812, the process 800 can include using the auto-adaptive mediator engine and the generated dialog tree to automatically perform the requested interaction with the conversational agent of the target entity, wherein the requested interaction is performed on behalf of the user and without receiving one or more user interventions during the requested interaction.

Figure 9:
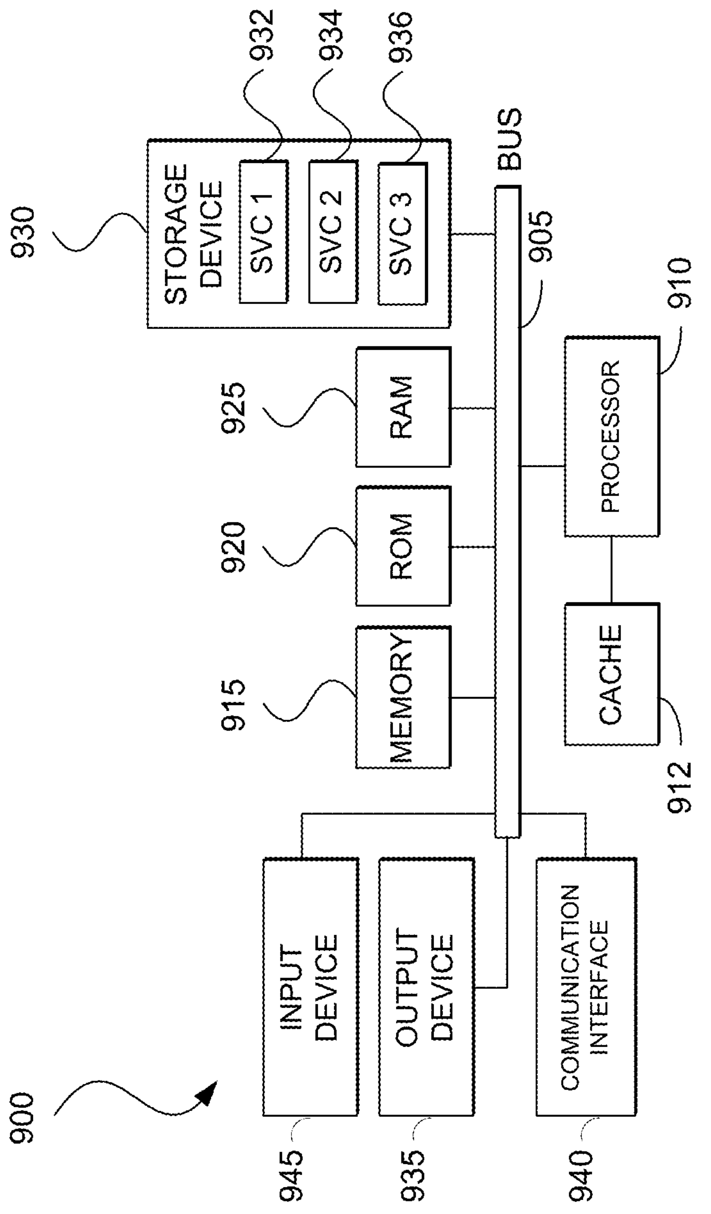
FIG. 9 is a block diagram illustrating an example of a computing system for implementing aspects of the present technology and aspects described herein.

FIG. 9 illustrates a computing system architecture, according to some aspects of the present disclosure. Components of computing system architecture 900 are in electrical communication with each other using a connection 905. Connection 905 can be a physical connection via a bus, or a direct connection into processor 910, such as in a chipset architecture. Connection 905 can also be a virtual connection, networked connection, or logical connection.

In some embodiments, computing system 900 is a distributed system in which the functions described in this disclosure can be distributed within a datacenter, multiple data centers, a peer network, etc. In some embodiments, one or more of the described system components represents many such components each performing some or all of the function for which the component is described. In some embodiments, the components can be physical or virtual devices.

Example system 900 includes at least one processing unit (CPU or processor) 910 and connection 905 that couples various system components including system memory 915, such as read-only memory (ROM) 920 and random-access memory (RAM) 925 to processor 910. Computing system 900 can include a cache of high-speed memory 912 connected directly with, in close proximity to, or integrated as part of processor 910.

Processor 910 can include any general-purpose processor and a hardware service or software service, such as services 932, 934, and 936 stored in storage device 930, configured to control processor 910 as well as a special-purpose processor where software instructions are incorporated into the actual processor design. Processor 910 may essentially be a completely self-contained computing system, containing multiple cores or processors, a bus, memory controller, cache, etc. A multi-core processor may be symmetric or asymmetric.

To enable user interaction, computing system 900 includes an input device 945, which can represent any number of input mechanisms, such as a microphone for speech, a touch-sensitive screen for gesture or graphical input, keyboard, mouse, motion input, speech, etc. Computing system 900 can also include output device 935, which can be one or more of a number of output mechanisms known to those of skill in the art. In some instances, multimodal systems can enable a user to provide multiple types of input/output to communicate with computing system 900. Computing system 900 can include communications interface 940, which can generally govern and manage the user input and system output. There is no restriction on operating on any particular hardware arrangement, and therefore the basic features here may easily be substituted for improved hardware or firmware arrangements as they are developed.

Storage device 930 can be a non-volatile memory device and can be a hard disk or other types of computer readable media which can store data that are accessible by a computer, such as magnetic cassettes, flash memory cards, solid state memory devices, digital versatile disks, cartridges, random access memories (RAMs), read-only memory (ROM), and/or some combination of these devices.

The storage device 930 can include software services, servers, services, etc., that when the code that defines such software is executed by the processor 910, it causes the system to perform a function. In some embodiments, a hardware service that performs a particular function can include the software component stored in a computer-readable medium in connection with the necessary hardware components, such as processor 910, connection 905, output device 935, etc., to carry out the function.

For clarity of explanation, in some instances, the present technology may be presented as including individual functional blocks including functional blocks comprising devices, device components, steps or routines in a method embodied in software, or combinations of hardware and software.

Any of the steps, operations, functions, or processes described herein may be performed or implemented by a combination of hardware and software services or services, alone or in combination with other devices. In some embodiments, a service can be software that resides in memory of a client device and/or one or more servers of a content management system and perform one or more functions when a processor executes the software associated with the service. In some embodiments, a service is a program or a collection of programs that carry out a specific function. In some embodiments, a service can be considered a server. The memory can be a non-transitory computer-readable medium.

In some embodiments, the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer-readable media. Such instructions can comprise, for example, instructions and data which cause or otherwise configure a general-purpose computer, special purpose computer, or special purpose processing device to perform a certain function or group of functions. Portions of computer resources used can be accessible over a network. The executable computer instructions may be, for example, binaries, intermediate format instructions such as assembly language, firmware, or source code. Examples of computer-readable media that may be used to store instructions, information used, and/or information created during methods according to described examples include magnetic or optical disks, solid-state memory devices, flash memory, USB devices provided with non-volatile memory, networked storage devices, and so on.

Devices implementing methods according to these disclosures can comprise hardware, firmware and/or software, and can take any of a variety of form factors. Typical examples of such form factors include servers, laptops, smartphones, small form factor personal computers, personal digital assistants, and so on. The functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

What is claimed is:

1. A method comprising:

obtaining a user communication indicative of a requested interaction by an auto-adaptive mediator engine and with a conversational agent of a target entity, wherein the requested interaction is performed on behalf of a user;

obtaining, from an artificial intelligence engine associated with the auto-adaptive mediator engine, a discovered intent corresponding to the requested interaction, wherein the discovered intent is an unknown intent for the auto-adaptive mediator engine;

generating a sample dialog for the requested interaction based on the discovered intent and input requirements determined by the auto-adaptive mediator engine for the requested interaction, wherein the sample dialog is generated using a dialog generator;

receiving user feedback corresponding to action items and expected inputs identified from the sample dialog and output for user review by the auto-adaptive mediator engine;

generating a dialog tree based on the sample dialog, the user feedback, and user-specific information of the user communication, wherein the dialog tree uniquely corresponds to the user and the requested interaction with the conversational agent of the target entity; and using the auto-adaptive mediator engine and the generated dialog tree to automatically perform the requested interaction with the conversational agent of the target entity without receiving one or more user interventions during the requested interaction.

2. The method of claim 1, wherein the conversational agent comprises a human agent (HA) of the target entity, or a virtual agent (VA) of the target entity.

3. The method of claim 1, wherein obtaining the user communication indicative of the requested interaction comprises:

performing, using a conversational large language model (LLM) of the auto-adaptive mediator engine, an interactive text-based communication session or an interactive voice-based communication session with the user to obtain the user communication.

4. The method of claim 1, further comprising:

analyzing, using an internal conversational platform associated with the auto-adaptive mediator engine, the user communication to identify one or more intents corresponding to the requested interaction;

determining that the identified one or more intents are not associated with a confidence score greater than a configured threshold, based on a determination that the interaction request corresponds to an unknown intent type for the auto-adaptive mediator engine, wherein the unknown intent type is not included in a plurality of intents associated with the auto-adaptive mediator engine; and transmitting the user communication to an external artificial intelligence engine configured to perform intent discovery.

5. The method of claim 4, wherein the unknown intent type is a type of intent unseen during training of the auto-adaptive mediator engine.

6. The method of claim 4, wherein the plurality of intents associated with the auto-adaptive mediator engine comprises one or more of:

known intent types cached by an internal cache of the auto-adaptive mediator engine; or known intent types observed during training of the auto-adaptive mediator engine.

7. The method of claim 1, further comprising:

using an internal conversational platform associated with the auto-adaptive mediator engine to analyze the user communication to thereby identify a domain corresponding to one or more of the requested interaction or the target entity.

8. The method of claim 7, wherein generating the sample dialog for the requested interaction is further based on the identified domain.

9. The method of claim 1, wherein the dialog generator is different from an internal conversational platform associated with the auto-adaptive mediator engine and is different from the artificial intelligence engine.

10. The method of claim 1, wherein the dialog generator comprises an internal large language model (LLM) associated with the auto-adaptive mediator engine or the artificial intelligence engine.

11. The method of claim 1, wherein generating the dialog tree further comprises:

populating the sample dialog with the user-specific information extracted from the user communication to thereby generate an output dialog;

verifying the output dialog against the discovered intent, the action items, and the expected inputs associated with the requested interaction; and generating the dialog tree based on the output dialog in response to successful verification of the output dialog.

12. The method of claim 11, wherein verifying the output dialog is based on a match score determined based on a comparison between the output dialog and the discovered intent, the action items, and the expected inputs.

13. The method of claim 1, further comprising:

determining that a message received from the conversational agent of the target entity represents an unknown question type or a request for an unknown user input, wherein the determination is based on using the auto-adaptive mediator engine to analyze the message to determine an agent intent; and transmitting a request to the user to provide information responsive to the unknown question type or unknown user input, wherein the request to provide information is generated by the auto-adaptive mediator engine based on determined agent intent.

14. The method of claim 1, wherein the dialog generator is selected from a plurality of pre-trained and domain-specific dialog generators, and wherein the selection is based on:

an identified domain of the requested interaction, the identified domain determined based on using a domain classification machine learning model to analyze the user communication indicative of the requested interaction.

15. The method of claim 14, wherein the selection is further based on a similarity score determined by the auto-adaptive mediator engine and corresponding to the selected dialog generator and one or more indicated user requirements of the requested interaction.

16. A system comprising:

one or more processors; and one or more computer-readable storage media having computer-readable instructions stored thereon, wherein the computer-readable instructions, when executed by the one or more processors, cause the one or more processors to:

obtain a user communication indicative of a requested interaction by an auto-adaptive mediator engine and with a conversational agent of a target entity, wherein the requested interaction is performed on behalf of a user;

obtain, from an artificial intelligence engine associated with the auto-adaptive mediator engine, a discovered intent corresponding to the requested interaction, wherein the discovered intent is an unknown intent for the auto-adaptive mediator engine;

generate a sample dialog for the requested interaction based on the discovered intent and input requirements determined by the auto-adaptive mediator engine for the requested interaction, wherein the sample dialog is generated using a dialog generator;

receive user feedback corresponding to action items and expected inputs identified from the sample dialog and output for user review by the auto-adaptive mediator engine;

generate a dialog tree based on the sample dialog, the user feedback, and user-specific information extracted from the user communication, wherein the dialog tree uniquely corresponds to the user and the requested interaction with the conversational agent of the target entity; and use the auto-adaptive mediator engine and the generated dialog tree to automatically perform the requested interaction with the conversational agent of the target entity without receiving one or more user interventions during the requested interaction.

17. The system of claim 16, wherein the one or more processors are further configured to:

analyze, using an internal conversational platform associated with the auto-adaptive mediator engine, the user communication to identify one or more intents corresponding to the requested interaction;

determine that the identified one or more intents are not associated with a confidence score greater than a configured threshold, based on a determination that the interaction request corresponds to an unknown intent type for the auto-adaptive mediator engine, wherein the unknown intent type is not included in a plurality of intents associated with the auto-adaptive mediator engine; and transmit the user communication to an external artificial intelligence engine configured to perform intent discovery.

18. The system of claim 16, wherein the one or more processors are further configured to:

use an internal large language model (LLM) associated with the auto-adaptive mediator engine to analyze the user communication to thereby identify a domain corresponding to one or more of the requested interaction or the target entity; and generate the sample dialog for the requested interaction based on the discovered intent, the input requirements, and the identified domain.

19. The system of claim 16, wherein, to generate the dialog tree, the one or more processors are configured to:

populate the sample dialog with the user-specific information extracted from the user communication to thereby generate an output dialog;

verify the output dialog against the discovered intent, the action items, and the expected inputs associated with the requested interaction; and generate the dialog tree based on the output dialog in response to successful verification of the output dialog.

20. One or more non-transitory computer-readable media comprising computer-readable instructions, which when executed by one or more processors, cause the one or more processors to:

obtain a user communication indicative of a requested interaction by an auto-adaptive mediator engine and with a conversational agent of a target entity, wherein the requested interaction is performed on behalf of the user;

obtain, from an artificial intelligence engine associated with the auto-adaptive mediator engine, a discovered intent corresponding to the requested interaction, wherein the discovered intent is an unknown intent for the auto-adaptive mediator engine;

generate a sample dialog for the requested interaction based on the discovered intent and input requirements determined by the auto-adaptive mediator engine for the requested interaction, wherein the sample dialog is generated using a dialog generator;

receive user feedback corresponding to action items and expected inputs identified from the sample dialog and output for user review by the auto-adaptive mediator engine;

generate a dialog tree based on the sample dialog, the user feedback, and user-specific information extracted from the user communication, wherein the dialog tree uniquely corresponds to the user and the requested interaction with the conversational agent of the target entity; and use the auto-adaptive mediator engine and the generated dialog tree to automatically perform the requested interaction with the conversational agent of the target entity without receiving one or more user interventions during the requested interaction.

* * * * *